United States Patent
Nucci et al.

(10) Patent No.: US 8,418,249 B1
(45) Date of Patent: Apr. 9, 2013

(54) CLASS DISCOVERY FOR AUTOMATED DISCOVERY, ATTRIBUTION, ANALYSIS, AND RISK ASSESSMENT OF SECURITY THREATS

(75) Inventors: Antonio Nucci, San Jose, CA (US); Prakash Mandayam Comar, East Lansing, MI (US); Sabyasachi Saha, Sunnyvale, CA (US); Lei Liu, East Lansing, MI (US)

(73) Assignee: Narus, Inc., Sunnyvale, CA (US)

( * ) Notice: Subject to any disclaimer, the term of this patent is extended or adjusted under 35 U.S.C. 154(b) by 0 days.

(21) Appl. No.: 13/293,986

(22) Filed: Nov. 10, 2011

(51) Int. Cl.
*G06F 11/00* (2006.01)

(52) U.S. Cl.
USPC .................. 726/23; 706/20; 706/48; 709/225

(58) Field of Classification Search ...................... 726/23
See application file for complete search history.

(56) References Cited

U.S. PATENT DOCUMENTS

| | | | |
|---|---|---|---|
| 6,173,068 B1 * | 1/2001 | Prokoski | 382/115 |
| 2002/0028021 A1 * | 3/2002 | Foote et al. | 382/224 |
| 2003/0200188 A1 * | 10/2003 | Moghaddam | 706/25 |
| 2004/0181375 A1 * | 9/2004 | Szu et al. | 703/2 |
| 2005/0049990 A1 * | 3/2005 | Milenova et al. | 706/48 |
| 2005/0050087 A1 * | 3/2005 | Milenova et al. | 707/102 |
| 2005/0060295 A1 * | 3/2005 | Gould et al. | 707/3 |
| 2005/0176057 A1 * | 8/2005 | Bremer et al. | 435/6 |
| 2006/0112039 A1 * | 5/2006 | Wang | 706/20 |
| 2006/0195269 A1 * | 8/2006 | Yeatman et al. | 702/20 |
| 2006/0242706 A1 * | 10/2006 | Ross | 726/23 |
| 2007/0063548 A1 * | 3/2007 | Eipper | 296/203.01 |
| 2007/0185994 A1 * | 8/2007 | Lalonde | 709/225 |
| 2007/0192863 A1 * | 8/2007 | Kapoor et al. | 726/23 |
| 2008/0010225 A1 * | 1/2008 | Gonsalves et al. | 706/11 |
| 2008/0091630 A1 * | 4/2008 | Bonissone et al. | 706/45 |
| 2008/0104101 A1 * | 5/2008 | Kirshenbaum et al. | 707/102 |
| 2008/0317286 A1 * | 12/2008 | Thorpe et al. | 382/103 |
| 2009/0177602 A1 * | 7/2009 | Ning et al. | 706/21 |
| 2012/0254333 A1 * | 10/2012 | Chandramouli et al. | 709/206 |

OTHER PUBLICATIONS

Kotenko, Igor, Pavel Laskov, and Christin Schäfer. "Intrusion detection in unlabeled data with quarter-sphere support vector machines." Proc. of the International GI Workshop on Detection of Intrusions and Malware & Vulnerability Assessment, No. P-46 in Lecture Notes in Informatics. 2004.*

Gu, Guofei, et al. "Towards an information-theoretic framework for analyzing intrusion detection systems." Computer Security-ESORICS 2006 (2006): 527-546.*

(Continued)

*Primary Examiner* — Carl Colin
*Assistant Examiner* — Syed Zaidi
(74) *Attorney, Agent, or Firm* — Fernandez & Associates, LLP

(57) ABSTRACT

A method for profiling network traffic of a network. The method includes obtaining a signature library comprising a plurality of signatures corresponding to a plurality of behavioral models, generating, based on a first pre-determined criterion, a group behavioral model associated with the signature library, wherein the group behavioral model represents a common behavior of a plurality of historical flows identified from the network traffic, wherein each of the plurality of signatures correlates to a subset of the plurality of historical flows, selecting a flow in the network traffic for including in a target flow set, wherein the flow matches the group behavioral model without matching any of the plurality of behavioral models, analyzing the target flow set to generate a new signature, and adding the new signature to the signature library. Further, each behavioral model is generated from a kernel constructed using boosting of decision tree learning methods.

20 Claims, 13 Drawing Sheets

OTHER PUBLICATIONS

Silva, Jorge, and Rebecca Willett. "Hypergraph-based anomaly detection of high-dimensional co-occurrences." Pattern Analysis and Machine Intelligence, IEEE Transactions on 31.3 (2009): 563-569.*

Yu, Jaehak, et al. "Real-time classification of Internet application traffic using a hierarchical multi-class SVM." KSII Transactions on Internet and Information Systems 4.5 (2010): 859-876.*

Pachghare, V. K., and Parag Kulkarni. "Performance analysis of pattern based network security." Computer Technology and Development (ICCTD), 2010 2nd International Conference on. IEEE, 2010.*

Masud, Mohammad M., et al., "Classification and Novel Class Detection in Concept-Drifting Data Streams under Time Constraints", IEEE Transactions on Knowledge and Data Engineering, vol. 23, No. 6, Jun. 2011, pp. 859-874.

Chandola, Varun, et al., "Data Mining for Cyber Security", Book Chapter in Data Warehousing and Data Mining Techniques for Computer Security, editor Anoop Singhal, pp. 83-103, Springer, 2006.

Crammer, Koby, et al., "Kernel Design using Boosting", Advances in Neural Information Processing Systems, vol. 15 (2002), pp. 537-544.

* cited by examiner

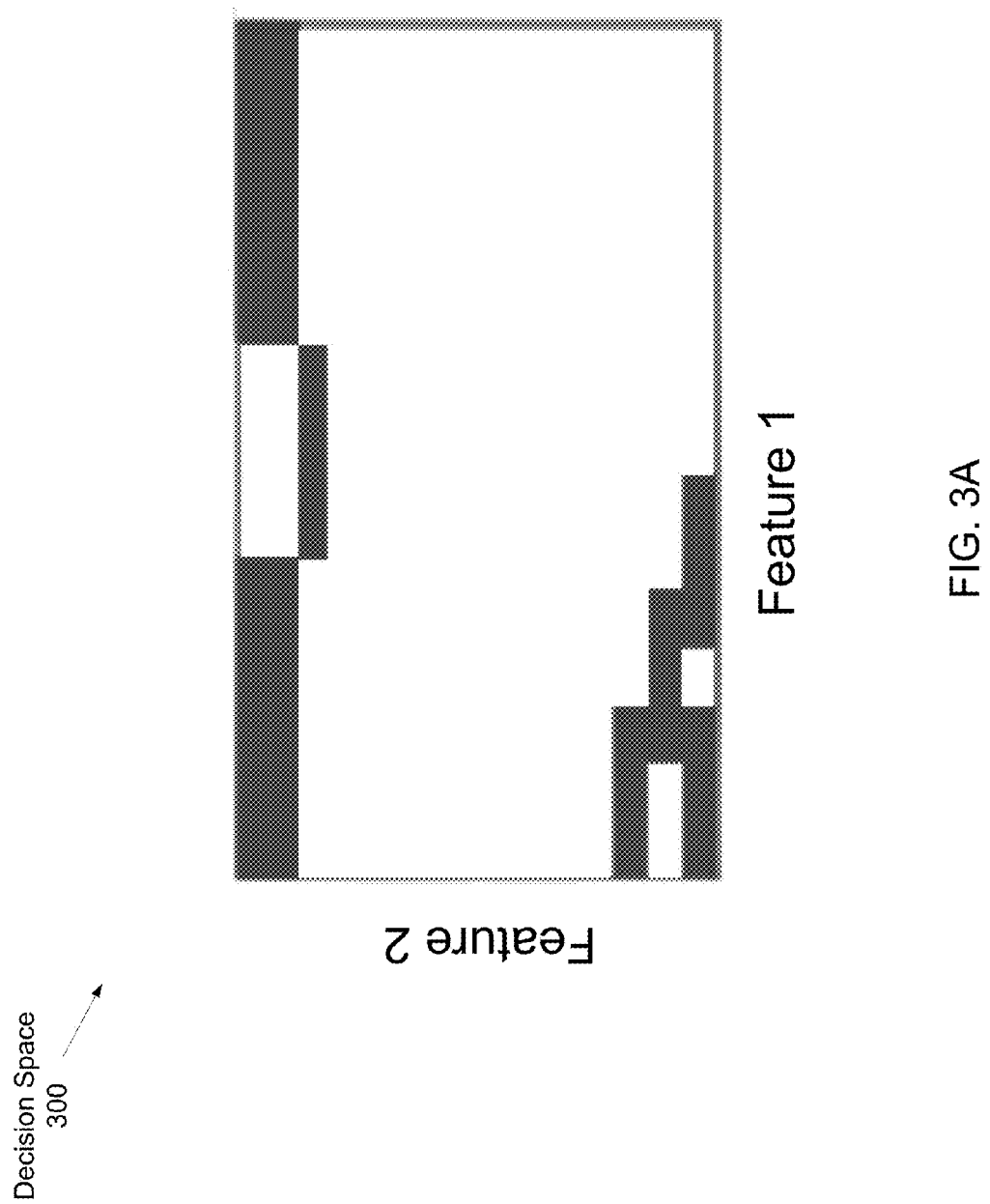

| | Feature A 361a | Feature B 361b | Feature C 361c | Feature D 361d | Ground Truth Class Label 361e |
|---|---|---|---|---|---|
| | Protocol | Bytes | Duration | Packets | Class |
| 362a | TCP | 1000 | 20 | 10 | Y |
| 362b | TCP | 1024 | 22 | 12 | Y |
| 362c | UDP | 120 | 12 | 5 | Y |
| 362d | UDP | 90 | 6 | 3 | Y |
| 362e | UDP | 94 | 12 | 4 | Y |
| 362f | TCP | 98 | 8 | 3 | N |
| 362g | TCP | 99 | 10 | 4 | N |
| 362h | UDP | 100 | 8 | 4 | N |
| 362i | UDP | 92 | 13 | 4 | N |

Dataset 360

Ground Truth Class Label Vector y 361f

Initial Weight Matrix 371 (all cells = 1/81)

Weight Matrix t 381

| 0.0215 | 0.0215 | 0.0029 | 0.0029 | 0.0029 | 0.0029 | 0.0215 | 0.0215 |
| --- | --- | --- | --- | --- | --- | --- | --- |
| 0.0215 | 0.0215 | 0.0029 | 0.0029 | 0.0029 | 0.0029 | 0.0215 | 0.0215 |
| 0.0029 | 0.0029 | 0.0215 | 0.0215 | 0.0215 | 0.0215 | 0.0029 | 0.0029 |
| 0.0029 | 0.0029 | 0.0215 | 0.0215 | 0.0215 | 0.0215 | 0.0029 | 0.0029 |
| 0.0029 | 0.0029 | 0.0215 | 0.0215 | 0.0215 | 0.0215 | 0.0029 | 0.0029 |
| 0.0029 | 0.0029 | 0.0215 | 0.0215 | 0.0215 | 0.0215 | 0.0029 | 0.0029 |
| 0.0215 | 0.0215 | 0.0029 | 0.0029 | 0.0029 | 0.0029 | 0.0215 | 0.0215 |
| 0.0215 | 0.0215 | 0.0029 | 0.0029 | 0.0029 | 0.0029 | 0.0215 | 0.0215 |

CLASS DISCOVERY FOR AUTOMATED DISCOVERY, ATTRIBUTION, ANALYSIS, AND RISK ASSESSMENT OF SECURITY THREATS

BACKGROUND OF THE INVENTION

1. Field of the Invention

The present invention relates to computers and computer networks. More particularly, the invention relates to profiling Internet traffic flows to identify network applications and/or security threats responsible for the traffic flows.

2. Background of the Related Art

In the past years, the number of cyber attacks keeps increasing affecting millions of systems. Such malicious activities, often termed as Malware (acronym from malicious software), includes different worms, botnets, trojans, backdoors, spyware, etc. Then, there is a new trend in exploiting social networks and mobile devices. Also, the sophistication and effectiveness of cyber-attacks have steadily advanced. These attacks often take advantage of flaws in software code, use exploits that can circumvent signature-based tools that are commonly used to identify and prevent known threats, and social engineering techniques designed to trick the unsuspecting user into divulging sensitive information or propagating attacks. These attacks are becoming increasingly automated with the use of botnets-compromised computers that can be remotely controlled by attackers to automatically launch attacks. Bots (short for robots) have become a key automation tool to speed the infection of vulnerable systems and are extremely stealthy in the way they communicate and ex-filtrate personal/proprietary information from the victims' machines/servers. The integration of such sophisticated computer attacks with well-established fraud mechanisms devised by organized crime has resulted in an underground economy that trades compromised hosts, personal information, and services in a way similar to other legitimate economies. This expanding underground economy makes it possible to significantly increase the scale of the frauds carried out on the Internet and allows criminals to reach millions of potential victims.

Such continuous and ever changing challenges to protect the users has made cyber-security is a very active and bleeding-edge research. This has become an arm race between the security researchers and malicious users. Today's approach to information security can be broken down into two major classes of technologies, host security, and network security.

A prevalent category of host-based security is malware prevention, comprising a broad group of agent-based solutions that look for particular signatures and behavioral signs of malicious code execution at the host level. This approach, known as blacklisting, focuses on matching specific aspects of application code and particular actions being attempted by applications for detection. Signature-based/blacklisting detection has been around for many years. In that same time, viruses, worms, sniffers, trojans, bots and other forms of malware have infiltrated e-mail, instant messaging, and later, social networking sites for the purpose of criminal financial gain. With improvements in correlation and centralized management, blacklisting still works very effectively in most distributed enterprise and capable to (i) pinpoint malicious activities with high detection rate while very low false positive/false negative rates, (ii) reverse engineering the malware executable to highlight malware inner properties such as message structure and message passing (strengths and weaknesses of the malware), and (iii) assess the level of risk of the threat by analyzing effects to the end-host (such as system calls, registries being touched, etc). However, because these signature-based models depend on advanced knowledge of malicious code and behaviors, some instances can be missed, leading to potential malicious execution.

On the network side, three prevalent approaches are blended together to offer network-based security, (i) firewall systems, (ii) intrusion detection/prevention systems (IDS/IPS) and (iii) network behavior anomaly detection (NBAD) systems. These three different approaches complement each other and are commonly adopted/deployed by enterprises to form a holistic network security strategy. Generally, the first two approaches tackle the network security problem in a similar fashion as the host security (usage of threat signatures specialized at the network level), and thus prone to similar benefits and shortfalls as for the host security. The third approach attempts to discover threats without requiring a-priori knowledge of the malicious code and behavior by using algorithms to generate model(s) that retain(s) the properties of good traffic and alarm for sessions that do not conform to the model. While effective in spotting threats never seen before, the third approach is still prone to high rate of false positive/false negative that the security analyst is forced to screen before making a decision. This shortfall is mostly due to the lack of a solid ground truth that the statistical tools can be trained on to produce precise statistical models emulating the threat activities.

A support vector machine (SVM) is a set of supervised learning methods that analyze statistically related data items and recognize patterns for classification and regression analysis. In particular, the SVM is a non-probabilistic binary linear classifier that receives a set of input data and predicts, for each given input, which of two possible classes the input belongs to. Given a set of training data items, each marked as belonging to one of two classes, an SVM training algorithm builds a model that assigns new data items into one class or the other. An SVM model is a representation of the data items as points in a hyperspace, mapped so that the data items of the separate classes are divided by a clear gap that is as wide as possible. New data items are then mapped into that same hyperspace and predicted to belong to a class based on which side of the gap they fall on.

The statistically related data items may correspond to points in a finite dimensional space, where each coordinate corresponds to one feature of the data items. The two classes of the SVM are often not linearly separable in that space. This finite dimensional space may be mapped into a higher dimensional space to allow easier separation by using a kernel method. Kernel methods are a class of algorithms for pattern analysis to find general types of relations (e.g., clusters, rankings, principal components, correlations, classifications) in general types of data items (e.g., sequences, text documents, sets of points, vectors, images, etc.). Kernel methods use a weighting function, referred to as a kernel, in kernel density estimation to estimate random variables' density functions. In particular, the use of the kernel enables the kernel methods to operate in the higher dimensional space without computing the coordinates of the data items in the higher dimensional space.

Decision tree learning is a method commonly used in data mining. The goal is to create a model that predicts the value of a target variable based on several input variables. In a decision tree, leaves (i.e., leaf nodes) represent class labels and branches (i.e., edges) represent conjunctions of features that lead to those class labels.

SUMMARY

In general, in one aspect, the present invention relates to a method for profiling network traffic of a network. The method includes (i) obtaining a training dataset having n entries each comprising a plurality of feature values and a ground truth class label, wherein the plurality of feature values correspond to a plurality of features of a historical flow in the network traffic, wherein the historical flow is tagged with the ground truth class label based on data characteristics associated with a corresponding application executing in the network, (i) constructing a ground truth kernel in a n×n matrix format by self multiplication of a ground truth class label vector, wherein the ground truth class label vector comprises n ground truth class labels each from one of the n entries in the training dataset, (ii) generating n initial boosting weights each corresponding to one of the n entries in the training dataset, wherein each of the n initial boosting weights represents estimated importance of a corresponding one of the n entries, (iii) generating, by a processor of a computer system, a first decision tree from the training dataset based on a decision tree learning algorithm using the n initial boosting weights, wherein the first decision tree maps each entry of the training dataset to a corresponding one in n first predicted class labels based on the plurality of feature values in the each entry, wherein a first predicted class label vector comprises the n first predicted class labels mapped by the first decision tree to the n entries in the training dataset, (iv) adjusting the n initial boosting weights to generate n adjusted boosting weights by comparing corresponding matrix elements between the ground truth kernel and a first kernel constructed by self multiplication of the first predicted class label vector, wherein a first matrix element mismatch increases the importance of the corresponding one of the n entries where the first matrix element mismatch occurs, (v) generating, by the processor, a second decision tree from the training dataset based on the decision tree learning algorithm using the n adjusted boosting weights, wherein the second decision tree maps the each entry of the training dataset to a second predicted class label based on the plurality of feature values in the each entry, wherein a second predicted class label vector comprises n second predicted class labels mapped by the second decision tree to the n entries in the training dataset, (vi) generating, by the processor, a behavioral model based at least on the first predicted class label vector and the second predicted class label vector, and (vii) determining a class label for a new flow in the network traffic based on whether the new flow matches the behavioral model.

In general, in one aspect, the present invention relates to a system for profiling network traffic of a network. The system includes a processor and memory storing instructions. The instructions, when executed by the processor, including functionality for (i) obtaining a training dataset having n entries each comprising a plurality of feature values and a ground truth class label, wherein the plurality of feature values correspond to a plurality of features of a historical flow in the network traffic, wherein the historical flow is tagged with the ground truth class label based on data characteristics associated with a corresponding application executing in the network, (ii) constructing a ground truth kernel in a n×n matrix format by self multiplication of a ground truth class label vector, wherein the ground truth class label vector comprises n ground truth class labels each from one of the n entries in the training dataset, (iii) generating n initial boosting weights each corresponding to one of the n entries in the training dataset, wherein each of the n initial boosting weights represents estimated importance of a corresponding one of the n entries, (iv) generating a first decision tree from the training dataset based on a decision tree learning algorithm using the n initial boosting weights, wherein the first decision tree maps each entry of the training dataset to a corresponding one in n first predicted class labels based on the plurality of feature values in the each entry, wherein a first predicted class label vector comprises the n first predicted class labels mapped by the first decision tree to the n entries in the training dataset, (v) adjusting the n initial boosting weights to generate n adjusted boosting weights by comparing corresponding matrix elements between the ground truth kernel and a first kernel constructed by self multiplication of the first predicted class label vector, wherein a first matrix element mismatch increases the importance of the corresponding one of the n entries where the first matrix element mismatch occurs, (vi) generating a second decision tree from the training dataset based on the decision tree learning algorithm using the n adjusted boosting weights, wherein the second decision tree maps the each entry of the training dataset to a second predicted class label based on the plurality of feature values in the each entry, wherein a second predicted class label vector comprises n second predicted class labels mapped by the second decision tree to the n entries in the training dataset, (vii) generating a behavioral model based at least on the first predicted class label vector and the second predicted class label vector, and (viii) determining a class label for a new flow in the network traffic based on whether the new flow matches the behavioral model.

In general, in one aspect, the present invention relates to a computer readable medium storing instructions, when executed by the computer to profile network traffic of a network, the instructions include functionality for (i) obtaining a training dataset having n entries each comprising a plurality of feature values and a ground truth class label, wherein the plurality of feature values correspond to a plurality of features of a historical flow in the network traffic, wherein the historical flow is tagged with the ground truth class label based on data characteristics associated with a corresponding application executing in the network, (ii) constructing a ground truth kernel in a n×n matrix format by self multiplication of a ground truth class label vector, wherein the ground truth class label vector comprises n ground truth class labels each from one of the n entries in the training dataset, (iii) generating n initial boosting weights each corresponding to one of the n entries in the training dataset, wherein each of the n initial boosting weights represents estimated importance of a corresponding one of the n entries, (iv) generating a first decision tree from the training dataset based on a decision tree learning algorithm using the n initial boosting weights, wherein the first decision tree maps each entry of the training dataset to a corresponding one in n first predicted class labels based on the plurality of feature values in the each entry, wherein a first predicted class label vector comprises the n first predicted class labels mapped by the first decision tree to the n entries in the training dataset, (v) adjusting the n initial boosting weights to generate n adjusted boosting weights by comparing corresponding matrix elements between the ground truth kernel and a first kernel constructed by self multiplication of the first predicted class label vector, wherein a first matrix element mismatch increases the importance of the corresponding one of the n entries where the first matrix element mismatch occurs, (vi) generating a second decision tree from the training dataset based on the decision tree learning algorithm using the n adjusted boosting weights, wherein the second decision tree maps the each entry of the training dataset to a second predicted class label based on the plurality of feature values in the each entry, wherein a second predicted class label vector comprises n second predicted class labels mapped by the second decision tree to the n entries in the training dataset, (vii) generating a behavioral model based at least on the first predicted class label vector and the second predicted class label vector, and (viii) determining a class label for a new flow in the network traffic based on whether the new flow matches the behavioral model.

Other aspects and advantages of the invention will be apparent from the following description and the appended claims.

BRIEF DESCRIPTION OF DRAWINGS

FIGS. 3A-3G show examples according to aspects of the invention.

DETAILED DESCRIPTION

Figure 1A:
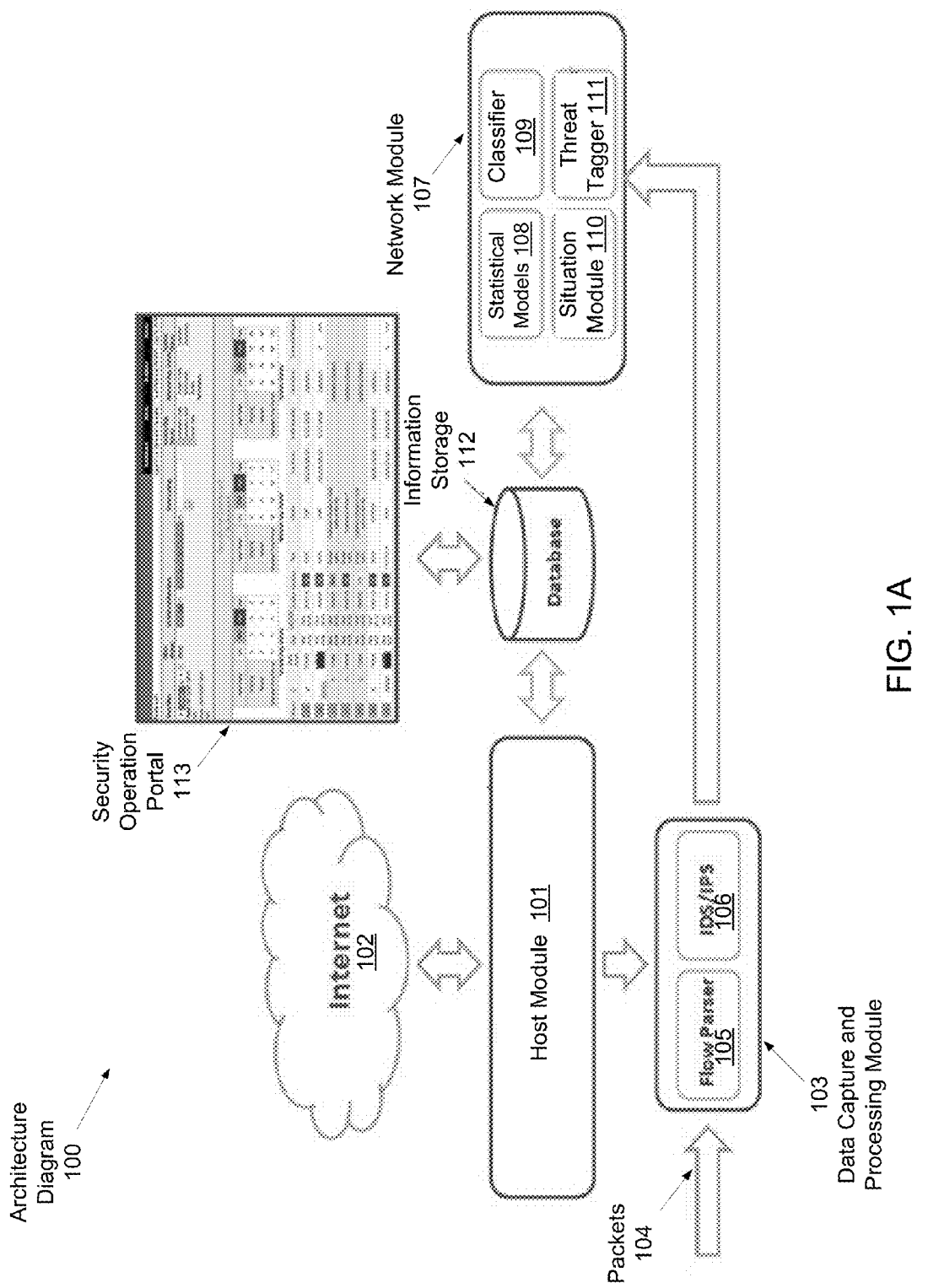
FIG. 1A shows an architecture diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Generally speaking, a traffic stream (or flow) between two network hosts is a series of data records regarding the communication between the two network hosts engaged in a Internet transaction. Each traffic stream is uniquely defined by a 5-tuple identifier (i.e., source address, destination address, source port, destination port, and transport protocol). Throughout this document, the terms "traffic flow", "flow", "traffic stream" and "stream" are used interchangeably.

When a data record of the traffic stream includes the entire packet (i.e., packet header and payload content), the traffic stream includes full packet visibility. Full packet visibility represents the finest level of information that can be collected for an Internet transaction.

From time to time, only information about packet headers (i.e., without payload content) can be collected for an Internet transaction. When a data record of the traffic stream includes only packet header, the traffic stream includes the traffic flow visibility only. Traffic flow visibility represents the second finest level of information that can be collected for an Internet transaction. In this case, an Internet transaction between two network hosts can only be partially reconstructed by grouping all packet headers with a common 5-tuple identifier (i.e., source address, destination address, source port, destination port, and transport protocol), while the fingerprint (at the packet payload level) of the application involved in such a transaction is lost.

In one or more embodiments of the invention, classifying an application with only traffic flow visibility is performed by leveraging statistical properties of the flow. Example of such statistics are average and standard deviation of packet sizes in the flow, or minimum, average, and maximum inter-arrival packet times in the flow, etc.

One way to collect traffic flows from the network is to leverage the router infrastructure. All routers today are capable to provide such information via protocols such as Netflow® (a registered trademark of Cisco Systems, Inc., San Jose, Calif.) or the equivalent JFlow® (a registered trademark of Juniper Networks, Inc., Sunnyvale, Calif.). Sampling techniques are often applied when routers are used to collect such information in order to reduce the amount of processing time required to carry over such a task. For example, Cisco routers are typically deployed with packet sampling rate 1:200 (or 1:1000), meaning that not all packet headers of a traffic flow are visible but only 1 out 200 packets of a flow (or 1 out of 1000 packets). Packet headers identified from a sampled version of a traffic flow is referred to as netflow-like records and the sampled version of the traffic stream includes the netflow-like record visibility only. Throughout this document, packet headers identified from non-sampled traffic flows or netflow-like records identified from sampled traffic flows are generally referred to as packet header records.

Malware detection approaches may be broadly categorized into two categories: anomaly-based and signature-based detection. Signature based detection uses the characterization of what is considered as malicious to decide the maliciousness of the program under inspection. For example, a Common N-Gram classification method may be used to create malware profile signatures. Specifically, signatures are extracted based on the probability of finding an n-gram in the payloads of virus or clean files. For example, the signature-based detection may be based on the aforementioned full packet visibility. Signature matching and behavior of existing malware can be used for detection. Useful signatures of existing malware provided great guidance in malware detection. Once a signature has been created, it is added to the signature based method's knowledge. A major weakness of the signature based approach is that they failed to detect the zero-day attacks, which are new attacks without any historical flows to enable signature extraction. Also it fails to detect threats that keep changing, for example, polymorphic and metamorphic malwares. For example, metamorphic malware automatically reprogram itself every time it is distributed or propagated. So, they will be difficult to capture with signature based approach as their signatures will also keep changing. Similarly, the polymorphic malwares are also difficult to identify using this technique as they self-mutates and use encryption.

On the other hand, an anomaly-based detection technique uses the knowledge of what is considered as good behavior to identify the anomaly as malicious program. A special type of anomaly based detection is specification-based detection. Specification based detection makes use of certain rule set of what is considered as good in order to decide the maliciousness of the program violating the predefined rule set. The programs violating the rule set are considered as malicious program. For example, the anomaly-based detection may be based on the aforementioned traffic flow visibility. The key advantage of anomaly-based detection is its ability to detect zero-day attacks. As noted above, zero-day attacks are attacks that are previously unknown to the malware detector system. There are two major limitation of this technique: Firstly, its high false alarm rate, which means high proportion of good programs are wrongly identified as malicious. Secondly, the complexity involved in determining what features should be learned in the training phase.

Embodiments of the invention provide a comprehensive end-to-end data security system for real-time discovery, analysis, risk assessment and attribution of information security threats by tightly blending together the host-based security (also referred to as host-security or host-view) and network-based security (also referred to as network-security or network view) in a way to provide the analysts the benefits of both while reducing their respective shortfalls. By crawling malware distribution sites for malware executables and by analyzing how the threat behaves in a sand-box environment (i.e., controlled), the host-view provides the system with unique insights into how the compromised machines communicate to malevolent servers and what is the most likely goal they have been designed for. Furthermore, by accessing and analyzing the executable code, the host view can automatically extract the threat state machine or threat signature. Generally, this precise and information-rich view can only be leveraged with knowledge that machines have been compromised (i.e., after-the-fact) and activated and more importantly with pre-knowledge of the malware executable code. To overcome these limitations, the network-view is also used, which is a more complete and macroscopic view of the network activity that exhibits common and persistent behavioral patterns shared by compromised hosts in the network. Statistical models are generated by training the models on flows tagged using the threat signatures provided by the host-view. Accordingly, the models are tuned both to capture the holistic properties shared by the malicious threat across as a whole (and thus capable to spot new ones) and to model the behavior of each of the discovered threat (and thus capable to discover the known threats even in case the malicious sessions may be encrypted to bypass traditional IDS and firewall network systems). As a consequence, false positive/negative is reduced to present more precise evidence of suspicious activities allowing the analyst to focus on events that require immediate attention. Furthermore, the network security framework will inspect flow payloads associated with suspicious flows to automatically extract the threat state-machines and executables, if present in the suspicious flow payloads, for providing to the host-security regarding potential threats that did not touch any of the monitored machines yet (and thus still unknown to the host security).

Also, from the macroscopic network view, it is possible to extract the information and behavior of all individual hosts. This helps to augment the analysis with situational awareness of the individual hosts. This involves analysis of communication graph of each host, type of each communication, reputation and location of the hosts it has communicated. Accordingly, communication behavioral patterns may be analyzed to identify anomalies in the malicious hosts' behavior.

FIG. 1A shows an architecture diagram (100) in accordance with one or more embodiments of the invention. As shown, the architecture diagram (100) includes host module (101), Internet (102), data capture and processing module (103), network module (107), information storage (112), and security operation portal (113).

In one or more embodiments, the host module (101) constantly searches the Internet (102) for malware executables. Specifically, the host module (101) downloads and installs the executable and analyzes the system calls and registry accesses (e.g., using binary program analysis including both static and dynamic analysis of executable code); furthermore, it studies the way the compromised machine (e.g., a bot) communicates back to the malevolent server (e.g., a command-and-control server of a botnet) and automatically extrapolates the complete state machine of the protocol being used, including a detailed understanding of the message format and passing mechanism; finally it provides the data capture and processing module (103) (more specifically, the IDS/IPS module (106)) with newly discovered signatures. The generated signatures are payload based and thus cannot detect malicious flows when they are encrypted. Also, it fails to capture zero-day threats.

In one or more embodiments, the data capture and processing module (103) collects the data in the form of full packets, packet headers and flow information. It uses a high speed capture card for capturing full packets. This module is capable of aggregating flow information and use flow parser (105) to extract all the flow level features. This module also has an intrusion detection/prevention system (IDS/IPS (106)) that leverages the work done by the host module (101) and runs the generated rules against incoming packets (104) where it searches deep within the packet payloads for matches; when there is a match, that flow is labeled appropriately, otherwise the flow is labeled as unknown.

In one or more embodiments, the network module (107) includes classifier (109) that analyzes the wider network traffic activity and classifies suspicious traffic patterns and associated hosts/servers in real-time according to pre-computed statistical models (108) that are generated in an off-line fashion and made available at regular times. The statistical models (108) are generated using machine learning algorithms to correlate statistical flow feature vectors (i.e., extracted on a per-flow basis by the flow parser (105)) and associated flow labels (provided by the IDP/IPS module (106)). Incoming flows that are matched to a specific threat model (i.e., one of the statistical models (108) associated with malicious activity) by the classifier (109) are immediately forwarded to the database in the information storage (112). On the other hand, flows that do not sufficiently match any of the threat models but that still retain the properties of malicious behavior are further analyzed by the threat tagger (111) at the payload level to resolve the threat identity by extracting the state machine shared by such flows and scoring the level of similarity between the newly extracted state machine and the ones available to the host module (101).

The network module (107) also involves an offline graph analysis engine (i.e., situation module (110)) to provide situational awareness knowledge and visibility into communication patterns annotated from the collected flows. It identifies suspicious hosts' behaviors which are not already labeled. Based on the behaviors of the hosts detected by the host module (101), situation module (110) builds a model to separate out anomalous behavior from the regular one. Once the behavioral model is available, threats that are analogous to the previous ones can be identified without depending on payload signatures. Also, studying the communication behavior of the hosts facilitates identifying a group of unfamiliar behaviors in the network. In either case, situation module (110) collects the group of flows and sends them to threat tagger (111) to generate the corresponding state machines, which are then sent to the host module (101).

In one or more embodiments, the information storage (112) stores all the data, associated labels, all information about threats, generated signatures, etc. The information storage (112) includes two portions: flow data storage and output databases. The flow data storage stores all flow payloads, flow features associated with threat labels, information about the threats with payload signatures, associated state machines, network connectivity information, etc. On the other hand, the generated behavioral patterns, risk assessment, labels and communities of hosts and servers engaged in the same or similar malevolent activity are stored into databases and displayed, for example through a web based user interface such as the security operation portal (113).

Although the architecture diagram (100) is described in the specific context of detecting malicious activities in the Internet (102), the techniques to combine host-based profiling and network-based profiling in a closed loop system are also applicable for profiling general network traffic to model behavioral characteristics of applications executing in the network and to label individual flows based on such behavioral models. Such techniques are described in reference to FIG. 1B and FIG. 2A below.

Figure 1B:
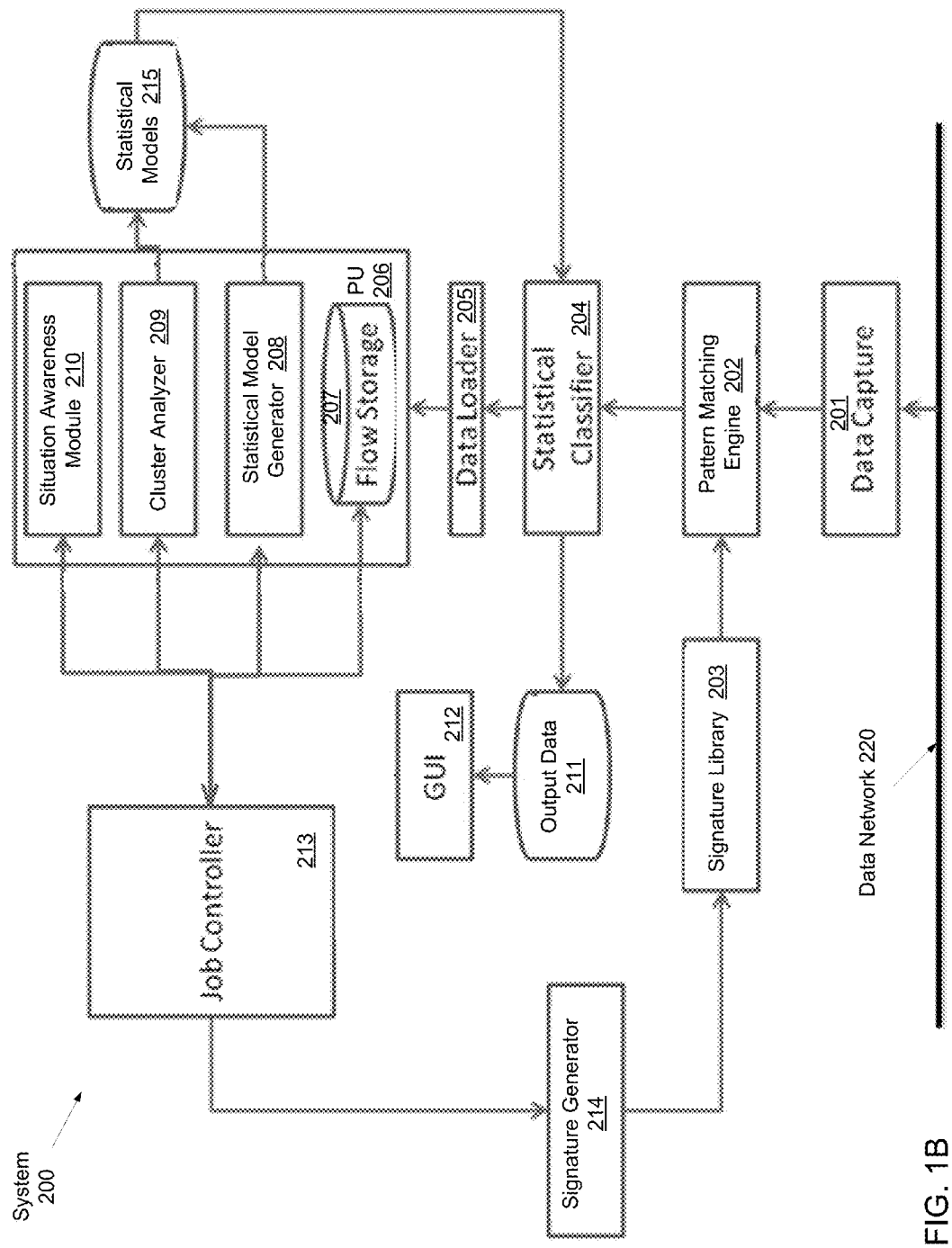
FIG. 1B shows a system block diagram according to aspects of the invention.

FIG. 1B shows a system block diagram of a system (200) in accordance with one or more embodiments of the invention. Those skilled in the art, having the benefit of this detailed description, will appreciate the components shown in FIG. 1B may differ among embodiments of the invention, and that one or more of the components may be optional. Although specific numbers of components are shown in FIG. 1B, different number of each component may be included. In one or more embodiments of the invention, one or more of the components shown in FIG. 1B may be omitted, repeated, supplemented, and/or otherwise modified from that shown in FIG. 1B. Accordingly, the specific arrangement of components shown in FIG. 1B should not be construed as limiting the scope of the invention.

A shown in FIG. 1B, the system (200) includes data network (202), data capture module (201), pattern matching engine (202), signature library (203), statistical classifier (204), data loader (205), processing unit (PU) (206), statistical models (215), job controller (213), signature generator (214), output data repository (211), and graphical user interface (GUI) (212). Further, the DU (206) includes flow storage (207), statistical model generator (208), cluster analyzer (209), and situation awareness module (210). The data network (220) may include wired and/or wireless portions of the Internet and/or other data communications networks such as wide area networks (WANs), local area networks (LANs), etc. The output data repository (211), flow storage (207), statistical models (215), or combinations thereof may be a data store such as a database, a file system, one or more data structures (e.g., arrays, link lists, tables, hierarchical data structures, etc.) configured in a memory or other suitable medium for storing data. As shown in FIG. 1B, an arrow between modules of the system (200) represent output data generated by a source module with or without at least a portion of input data passed through the source module. Generally, the signature library (203), the pattern matching engine (202), and the data capture module (201) correspond to the host-based security tasks depicted in FIG. 1A, while the statistical classifier (204), the PU (206), the statistical models (215), and the signature generator (214) correspond to the network-based security tasks depicted FIG. 1A.

In one or more embodiments, the data capture module (201) is configured to observe and collect information regarding traffic streams (e.g., packet headers and/or full packet streams) and to filter and organize the collected traffic stream data regarding duplicate records or out-of-order records. Specifically, the data capture module (201) extracts the payload and the flow-features for sending to the pattern matching engine (202) and the statistical classifier (204). For example, the data capture module (201) includes functionality of the flow parser (105) of FIG. 1A that extracts statistical features on a per-flow basis while the pattern matching engine (202) corresponds to the IDS/IPS (106) of FIG. 1A that analyzes these received packets and generates flow labels based on existing payload based signatures in the signature library (203). In particular, these signatures correspond to applications executing in the data network (220) and may be generated by the host module (101) of FIG. 1A to represent data characteristics associated with the corresponding applications. For example, the host module (101) may generate each signature by analyzing a set of historical flows generated from a corresponding application. In the context of FIG. 1A, the signature is associated with a malicious activity generated by a malware application. In one or more embodiments, each of these signatures is a layer 7 signature generated by analyzing layer 7 contents of collected historical flows. In one or more embodiments, in addition to pre-existing signatures, the signature library (203) is periodically extended by including new signatures generated by the signature generator (214).

Common behavior may exist among flows matching any signature in the signature library (203). In the context of FIG. 1A where each signature is associated with a malicious activity generated by a malware application, flows matching any of these signatures exhibit some common malicious behavior. In one or more embodiments, a group behavioral model is generated by the statistical model generator (208) to represent a common behavior associated with the signature library (203). Specifically, the common behavior is exhibited by a set of historical flows associated with the signature library (203). In one or more embodiments, these historical flows may be identified from the output of the data capture module (201) by the pattern matching engine (202) as matching any signature in the signature library (203). In one or more embodiments, these historical flows may be identified from the output of the data capture module (201) by the statistical classifier (204) as matching any behavioral model corresponding to a signature in the signature library (203). Accordingly, each signature matches a corresponding subset (referred to as the matched subset) of these historical flows in the sense that the signature or a behavioral model thereof is matched to flows in the corresponding subset. In the context of FIG. 1A where each signature is associated with a malicious activity, the group behavioral model is referred to as a threat model representing common behavior of multiple malicious activities. In one or more embodiments, determining a match requires a confidence measure of a comparison associated with the match to exceed a pre-determined level.

In one or more embodiments, the group behavioral model is generated by analyzing layer 3 and/or layer 4 contents (referred to as layer3/layer4) of the set of historical flows based on a supervised machine learning algorithm. Using the same supervised machine learning algorithm, the statistical model generator (208) is further configured to analyze, for each signature in the signature library (203), a matched subset of the historical flows to generate a corresponding behavioral model representing specific behavior exhibited in the matched subset. Such behavioral model is in turn used to further identify additional flows to be added to the set of historical flows in a recursive manner. In particular, the corresponding behavioral model is generated by analyzing layer 3 and/or layer 4 contents of the matched subset based on the supervised machine learning algorithm. As shown in FIG. 1B, the group behavioral model associated with the signature library (203) and other behavioral models each associated with an individual signature in the signature library (203) are stored as the statistical models (215) to be used by the statistical classifier (204). In one or more embodiments, the statistical models (215) are generated based on the aforementioned layer 3 and/or layer 4 contents and are referred to as layer 3/layer 4 models.

In one or more embodiments, the supervised machine learning algorithm takes flow-based features from the data capture module (201) as input. Example features are listed in TABLE 1 below. Accordingly, each flow is represented by a vector of these features in the output of the data capture module (201) that is sent to the statistical model generator (208) passing through the intervening modules in the system (200). Note that for some flow, some of these features may be missing and the vector may be in sparse format. At any single time based on the flow-based features (i.e., feature vectors) observed to that time point, the statistical model generator (208) creates a decision boundary for identifying flows exhibiting the aforementioned common behavior associated with the signature library (203) or for identifying flows exhibiting the aforementioned specific behavior associated with a particular signature in the signature library (203). For example, the statistical model generator (208) may create a decision boundary for identifying general malicious flows labeled by macro-profiling or a particular class of malicious flows labeled by micro-profiling. One of the tasks of the statistical model generator (208) is to identify the important features that are responsible for creating the boundary. FIG. 3A shows an example two dimensional decision space (300) defined by example feature 1 and feature 2, which are identified as the important features for creating the boundary. The statistical model generator (208) may generate similar subspaces in a higher dimension with more than two features. The dark segments in the two dimension space represent a threat region defined by the aforementioned boundary. For the example where the decision space (300) corresponds to a behavioral model associated a particular signature in the signature library (203), the threat region represents the specific behavior of flows matching the particular signature. For the example where the decision space (300) corresponds to the group behavioral model, the threat region encompasses all the individual threat region of each behavioral model associated with each signature in the signature library (203). More details of the statistical model generator (208) generating the statistical models (215) using supervised machine learning algorithm is described in reference to the method flow chart shown in FIG. 2B bellow. An example of generating the statistical models (215) using supervised machine learning algorithm is described in reference to FIGS. 3D-3G bellow.

TABLE 1

| | |
|---|---|
| sport: | source port |
| dport: | destination port |
| protocol: | protocol used |
| direction: | client to server and server to client |
| pkts: | number of packets |
| | total count of packets without payload |
| bytes: | total number of bytes |
| pay_bytes: | total number bytes from all payloads |
| Duration: | Client to server (c2s) and server to client (s2c) |
| | (max,min,avg,std) of pkt_size |
| IAT (1 to 10: | inter-arrival time |
| (max,min,avg,std) of pay_size: | payload size |
| TCP flags: | acks, fins, resets, pushs, urgs, cwrs, eces |
| pkt(X)_size: | size of pkt X, X = 1, . . . , 10 |
| IAT_(X): | inter arrival times, X = 1, . . . , 10 |
| pay(X)_size: | payload sizes, X = 1, . . . , 10 |

In one or more embodiments, the group behavioral model and the behavioral model in the statistical models (215) are used by the statistical classifier (204) to classify, in real time, a flow from the data network (220) based on the feature vector of the flow generated by the data capture module (201). Specifically, the statistical classifier (204) is configured to analyze the flow to identify whether the flow matches the group behavioral model associated with the signature library (203) or matches any behavioral model associated with any signature in the signature library (203). For the example where the decision space (300) corresponds to the group behavioral model, the flow is identified as matching the group behavioral model if it falls into the threat region. For the example where the decision space (300) corresponds to a behavioral model associated with a particular signature, the flow is identified as matching the particular behavioral model if it falls into the threat region. In the context of FIG. 1A, the statistical classifier (204) uses the group behavioral model to identify whether the flow is malicious or not. If the flow is identified as malicious, the statistical classifier (204) uses the behavioral models to identify a particular threat label corresponding to one of the signatures in the signature library (203). The outputs of the statistical classifier (204) are then stored in the output data repository (211) for viewing by a security analyst via the GUI (212). An example screenshot generated by the GUI (212) is depicted as the security operation portal (113) in FIG. 1A.

While the pattern matching engine (202) is capable of tagging flows with threat labels by matching data patterns in the flow to signatures in the signature library (203), a flow with encrypted payload data may escape detection by the pattern matching engine (202). In one or more embodiments, the statistical classifier (204) classifies each flow not labeled by the pattern matching engine (202) using the statistical models (215).

In one or more embodiments, the statistical classifier (204) is further configured to generate a suspicious flag for flows that are unforeseen to the statistical classifier (204). This is crucial to deal with the zero-day attacks. The suspicious flag is raised when the statistical classifier (204) finds high level of uncertainty and cannot classify the flow by matching to one of the existing behavioral models with high confidence. In one or more embodiments, the suspicious flag is raised when the statistical classifier (204) determines that the flow matches the group behavioral model but a correlation between the flow and any corresponding application of the signatures is not meeting a pre-determined level. For example, the correlation may be determined simply by the result of the pattern matching engine (202) comparing the flow to signatures in the signature library (203). In addition, the correlation may also be determined by the result of the statistical classifier (204) comparing the flow to the corresponding behavioral model for each of the signatures in the signature library (203) without using the signatures themselves. Accordingly, the flow is included in a target flow set if tagged with the suspicious flag, i.e., if the flow is determined as matching the group behavioral model without the correlation meeting the pre-determined level. In one or more embodiments, the target flow set is stored in the flow storage (207). More details of the statistical classifier (204) are described in reference to the schematic diagram shown in FIG. 1C below.

Figure 1C:
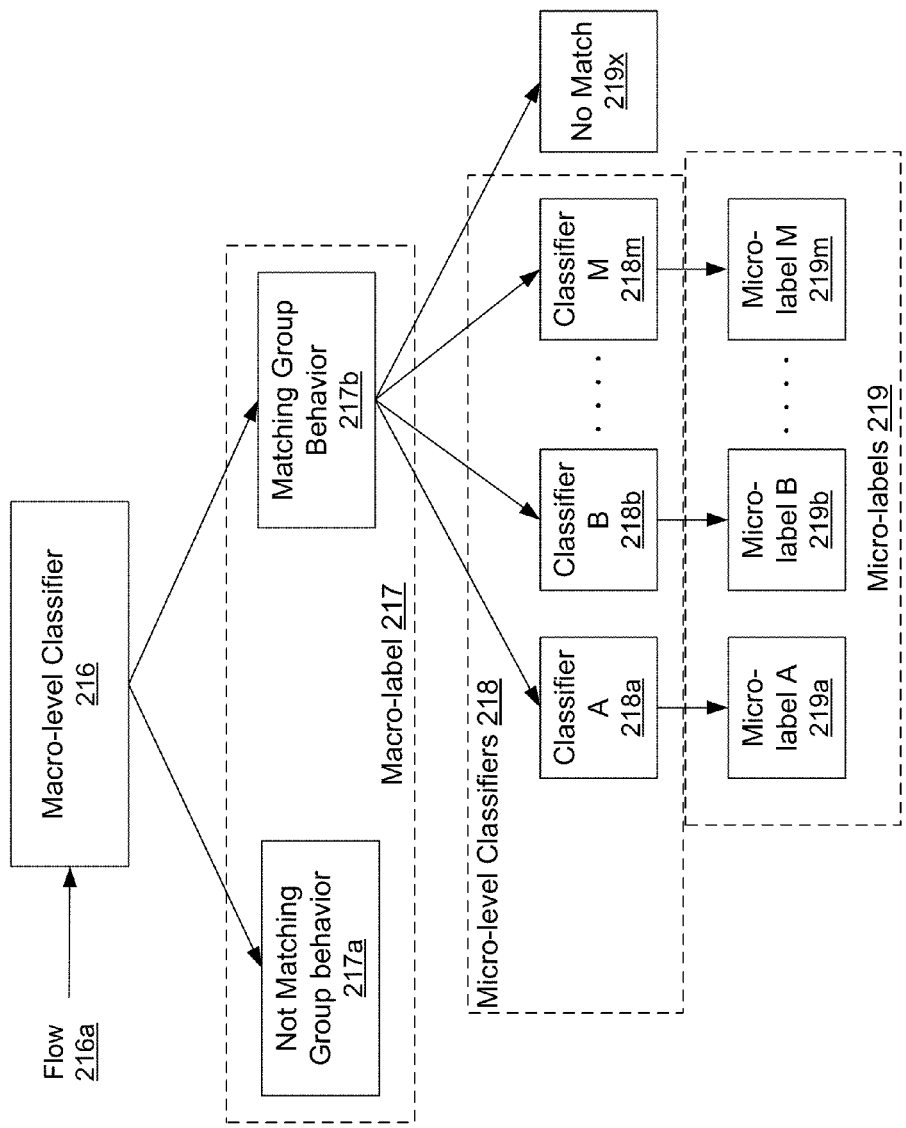
FIG. 1C shows a schematic diagram according to aspects of the invention.

FIG. 1C shows detail of the statistical classifier (204) as including the macro-level classifier (216) and the micro-level classifiers (218) having micro-level classifier A (218a), micro-level classifier B (218b), through micro-level classifier M (218m). As discussed above, the macro-level classifier (216) classifies the input flow (216a) by tagging the input flow (216a) with the macro-label (217). Specifically, the input flow (216a) is tagged with the macro-label "matching group behavior" (217b) if it matches the aforementioned group behavior. Conversely, the input flow (216a) is tagged with the macro-label "not matching group behavior" (217b) if it does not match the aforementioned group behavior. For example in the context of FIG. 1A, the "matching group behavior" (217b) may be referred to as "known/bad" indicating malicious group behavior while the "not matching group behavior" (217a) may be referred to as "unknown." In case the flow (216a) is tagged with the "matching group behavior" (217b), it is further classified by any of the micro-level classifiers (219). Accordingly, the flow (216a) may be tagged with any of the micro-labels (219) (i.e., micro-label A (219a), micro-label B (219b), through micro-label M (219m)) depending on if any of the micro-level classifier A (218a), micro-level classifier B (218b), through micro-level classifier M (218m) finds a match. In the context of FIG. 1A, each of the micro-label A (219a), micro-label B (219b), through micro-label M (219m) corresponds to a particular threat class further classifying the malicious nature of the flow (216a). In case none of the micro-level classifiers (218) finds any match, the flow (216a) is identified as no match (219x) and included in the aforementioned target flow set. In one or more embodiments, one of more of the micro-level classifiers (218) may be using signature based model(s). In one or more embodiments, one or more of the micro-level classifiers (218) may be using behavioral model(s).

Returning to the discussion of FIG. 1B, in one or more embodiments, the cluster analyzer (209) is configured to analyze, when a size of the target flow set exceeds a pre-determined size, the target flow set to identify a plurality of clusters based on an unsupervised machine learning algorithm. This unsupervised machine learning algorithm finds all clusters of suspicious flows in the target flow set automatically without requiring the number of clusters to be specified. The cluster analyzer (209) uses both flow-based features (i.e., the aforementioned feature vectors) and corresponding payloads stored in the flow storage (207) for creating clusters in the flow storage (207).

In one or more embodiments, a new behavioral model is generated, in response to the target flow set being clustered, directly from a cluster by the statistical model generator (208) and added to the statistical models (215) for use by the statistical classifier (204). In one or more embodiments, a new behavioral model is generated indirectly and contingent upon validation and labeling of a signature generated from the cluster, as described below.

In one or more embodiments, the signature generator (214) is configured to analyze, in response to the target flow set being clustered, each cluster in the flow storage (207) to generate a new signature representing data characteristics associated with suspicious flows in the cluster. For example, the new signature is a layer 7 signature generated by analyzing layer 7 contents of suspicious flows in the cluster. In one or more embodiments, the signature generator (214) analyzes the similarity in the layer 7 payloads in the cluster to generate the new signature. Once generated, the new signature is added to the signature library (203) to augment the previously collected signatures, e.g., from the host module (101) of FIG. 1A. For example, the generated new signature may be communicated to the security experts operating the host module (101) to be validated and labeled before adding into the signature library (203). Such new signature is in turn used to further identify additional flows to be added to the set of historical flows in a recursive manner. Using the aforementioned supervised machine learning algorithm, the statistical model generator (208) analyzes, for this new signature added to the signature library (203), a matched subset of the historical flows to generate a corresponding behavioral model representing specific behavior exhibited in the matched subset of this new signature.

In one or more embodiments, the statistical model generator (208) is further configured to update the group behavioral model in response to adding the new signature to the signature library (203) based on an expanded set of historical flows matching the expanded signature library (203). Accordingly, the statistical classifier (204) is further configured to update the target flow set in response to updating the group behavioral model.

In one or more embodiments, the system (200) further includes a situation awareness module (210) that is configured to identify suspicious hosts in the data network (220) based on malicious activities identified by the statistical classifier (204). In one or more embodiments, analyzing the target flow set and generating the new signature include analyzing association of suspicious flows, identified by the statistical classifier (204), with the suspicious hosts identified by the a situation awareness module (210).

The supervised and unsupervised machine learning algorithms used by the statistical model generator (208) and the cluster analyzer (209) identify the malicious flows in the network using mostly flow level data. In one or more embodiments, the reputation of individual hosts and/or their proximity from the known malicious networks is leveraged to assist in identifying malicious behavior. The situation awareness module (210) focuses on the communication graph of the data network (220) to accomplish the following three tasks. Firstly, situation awareness module (210) augments the machine learning analysis with additional information on hosts involved in the flows considered for evaluation, i.e., the aforementioned set of historical flows and/or the target flow set. Secondly, situation awareness module (210) identifies behavioral properties of malicious hosts. Often, a compromised machine (e.g., a malicious host) is susceptible to multiple threats and exhibits other anomalies that are not already detected. Thirdly, situation awareness module (210) models the communication behavior of malicious hosts such that similar behavior of some other hosts in the data network (220) can be detected. We can identify some stealthy malicious behavior with this analysis which remains undetected otherwise.

As noted above, all the flow information, including payloads, flow-based features, and the corresponding labels are stored in the flow storage (207). In one or more embodiments, distributed systems (e.g., Hadoop cluster known to those skilled in the art) are used for managing the large amount of data stored in the flow storage (207). Such distributed system includes data loader (205) configured to load the data into the distributed file systems, the PU (206) configured as distributed computing facilities, and job controller (213) configured to schedule and manage supervised machine learning, unsupervised machine learning, and situation awareness analytic tasks that are submitted to the PU (206).

Figure 2A:
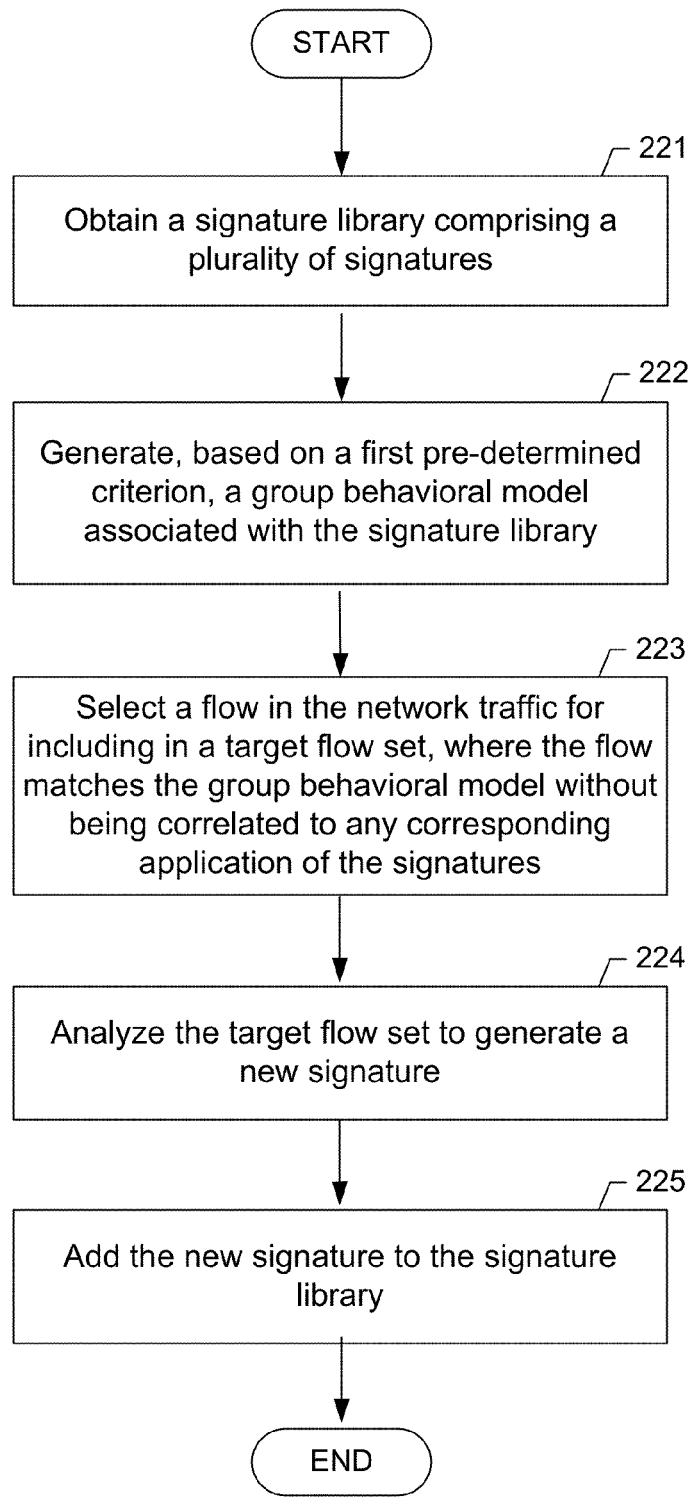
FIG. 2A shows a method flow chart according to aspects of the invention.

FIG. 2A depicts a flowchart of a method in accordance with one or more embodiments of the invention. In one or more embodiments of the invention, one or more of the steps shown in FIG. 2A may be omitted, repeated, and/or performed in a different order. Accordingly, embodiments of the invention should not be considered limited to the specific arrangements of steps shown in FIG. 2A. In one or more embodiments of the invention, the method depicted in FIG. 2A may be practiced using system (200) described with respect to FIG. 1B above.

Initially in Step 221, a signature library is obtained that includes signatures each representing data characteristics associated with a corresponding application executing in a network. In one or more embodiments, these signatures are layer 7 signatures. An example signature library is described in reference to FIG. 1B above.

In Step 222, a group behavioral model associated with the signature library is generated based on a pre-determined criterion. Specifically, the group behavioral model represents a common behavior of a set of historical flows identified from the network traffic, wherein each of the signatures correlates to a subset of the plurality of historical flows. An example group behavioral model is described in reference to FIG. 1B and FIG. 3A above.

In Step 223, a flow in the network traffic is selected for including in a target flow set, where the flow matches the group behavioral model without being correlated to any corresponding application of the signatures. In one or more embodiments, selecting the flow in the network traffic for including in the target flow set includes: (i) analyzing the flow based on a pre-determined criterion to identify the flow as matching the group behavioral model, (ii) determining a correlation between the flow and any corresponding application of the signatures as not meeting a pre-determined threshold, and (iii) including, in response to identifying the flow as matching the group behavioral model and the correlation not meeting the pre-determined threshold, the flow in the target flow set. An example target flow set is described in reference to FIG. 1B above.

In Step 224, the target flow set is analyzed to generate a new signature. In one or more embodiments, analyzing the target flow set to generate the new signature includes: (i) analyzing, in response to a size of the target flow set exceeding a pre-determined size, the target flow set to identify a number of clusters in the target flow set, and (ii) analyzing at least one cluster of the plurality of clusters to generate the new signature representing data characteristics associated with the at least one cluster.

In Step 225, the new signature is added to the signature library. Accordingly, the group behavioral model and the target flow set are updated in response to adding the new signature to the signature library.

More details of the method steps depicted in FIG. 2A are described in the example data flow diagrams depicted in FIGS. 3B and 3C below.

Turning to the discussion of the aforementioned supervised machine learning algorithm, the algorithm listed in TABLE 2 employs a supervised learning method to construct a non-parametric kernel matrix from a training dataset that maximally aligns with the similarity of classes in the training dataset. In this approach, a kernel matrix is trained for each class, by first subsampling and re-labeling the training instances (e.g., flows in the training dataset) belonging to that class as positive while those belonging to other classes as negative. Let y be the re-labeled binary class vector and $G=yy^T$ be a square matrix whose ij-th element is equal to +1 if the i-th and j-th training instances are in the same class, or −1 otherwise. The algorithm in TABLE 2 learns a kernel matrix K that is highly correlated with the class similarity matrix G. This is accomplished by minimizing the following exponential loss function:

$$L = \sum_{ij} \exp(-K_{ij} G_{ij})$$

In particular, the algorithm in TABLE 2 adaptively learns a weak kernel $K_t$ at the t-th iteration to reduce the overall misalignment between the current estimate of the kernel and the class similarity matrix G. After sufficient number of iterations, the final kernel is obtained via a linear combination of the weak kernels, i.e., $K=\Sigma \alpha_t K_t$, where $\alpha_t$ is an estimated parameter that measures the degree of alignment between the weak kernel $K_t$ and G. In addition, a weight vector $W_t(i)$ is associated with each training instance i in the training dataset. The weight vector determines how the training set will be re-sampled at the t-th iteration to build a weak hypothesis (i.e., decision tree) $h_t$. The weak kernel is computed based on the predictions made by the weak hypothesis $h_t$ using the formula $K_t(x_i, x_j) = h_t(x_i) h_t^T(x_j)$.

TABLE 2

Input: $D = \{(x_1, y_1), (x_2, y_2), \ldots (x_n, y_n)\} \in X \times Y$
    where $y_i \in$ to $\{+1, -1\}$, $i = 1 \ldots n$, $y=[y_i]_n$
Output: K: n × n kernel matrix
Initialize:
    T = maximum number of Iterations
    $P = [1/n^2]_{n \times n}$    //Assign equal weight to all entries in initial weight matrix
    $W_0(i) = 1/n$    //Assign initial weights to each flow
    $G = yy^T$    //Compute ground truth kernel
    $h_0 = [0]_n$    //Initialize predicted class label vector to zeros
For t = 1 to T do
    1. Train a decision tree on D using weights $W_{t-1}(i)$
        $h_t : X \rightarrow \{-1, +1\}$ be output vector of decision tree, referred to as a predicted class label vector
    2. Construct a rank one kernel from output vector $h_t$ and transposed vector $h_t^T$
        $K_t = h_t * h_t^T$
    3. Compute weights for each kernel matrix element
        $P \leftarrow P \cdot \exp(-G \cdot K_t)$ and Normalize
            //Assigns more weight to wrongly learnt entry and less weight to correctly learnt entries
    4. Compute adjusted boosting weights for each flow
        $W_t(i) = \Sigma_j P_{ij}$ where $P = [P_{ij}]$
    5. Compute boosting weights $\alpha_t$ for $h_t$
        $\epsilon_t = \Pr(I(K_t^\dagger G))$
        $\alpha_t = 0.5 \log((1-\epsilon_t)/\epsilon_t)$
    6. Compute cumulative predicted Kernel
        $K \leftarrow K + \alpha_t K_t$
End for return final K The final kernel K returned from the algorithm in TABLE 2 is in turn used to generate a support vector machine (SVM). In one or more embodiments, the behavioral model for a particular threat class in the micro-profiling of traffic flows is one such SVM. In one or more embodiments, the group behavioral model used in the macro-profiling of traffic flows is one such SVM. As a binary classifier, such SVM classifies those flows matching the (group) behavioral model as belonging to a class and other flows not matching the (group) behavioral model as not belonging to the class. The algorithm listed in TABLE 2 is further illustrated in the method steps shown in FIG. 2B and the example shown in FIGS. 3D-3G.

Figure 2B:
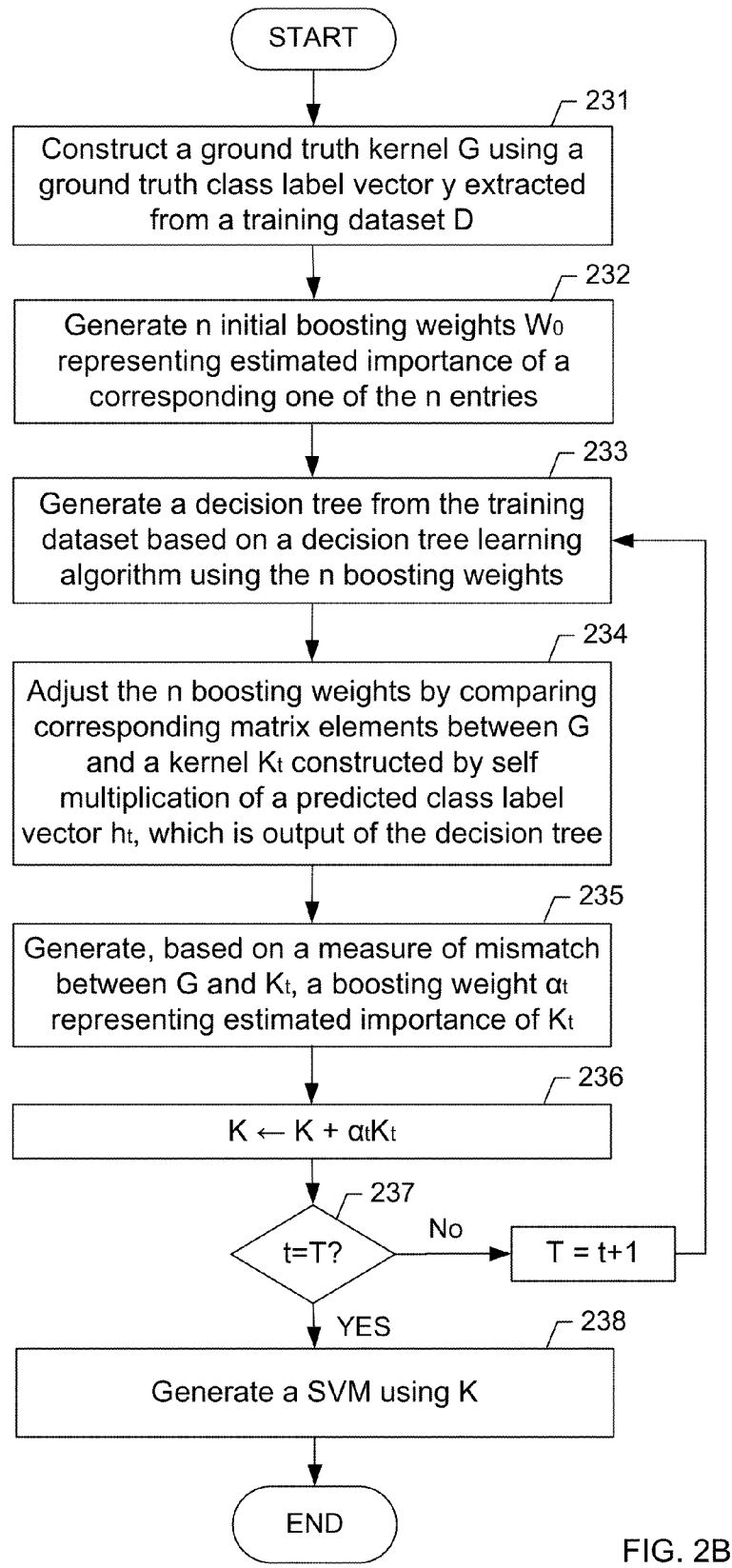
FIG. 2B shows a method flow chart according to aspects of the invention.

FIG. 2B depicts a flowchart of a method in accordance with one or more embodiments of the invention. In one or more embodiments of the invention, one or more of the steps shown in FIG. 2B may be omitted, repeated, and/or performed in a different order. Accordingly, embodiments of the invention should not be considered limited to the specific arrangements of steps shown in FIG. 2B. In one or more embodiments of the invention, the method depicted in FIG. 2B may be practiced using system (200) described with respect to FIG. 1B above.

As shown in FIG. 2B, the method steps uses a training dataset D having n entries each including multiple feature values and a ground truth class label. In particular, each entry in the training dataset corresponds to a historical flow in the network traffic while the multiple feature values correspond to a set of features of the historical flow. Example flow features are shown in TABLE 1 above. The training dataset D is used to generate a behavior model for a particular classifier, such as any of the micro-level classifiers (218) or the macro-level classifier (216). Accordingly, each historical flow is tagged with the corresponding ground truth class label based on the particular classifier that is configured to identify data characteristics associated with a corresponding application executing in the network. In this context, the training dataset D is referred to as a ground truth training dataset. For example, if the historical flow is tagged by the classifier with a ground truth class label representing a particular threat class, the flow is considered, as the ground truth, to match data characteristics associated with a malicious application responsible for the threat class. For example, the flow may be generated by such malicious application.

An example training dataset D is shown as dataset (360) in FIG. 3D, where there are 9 (i.e., n=9) entries (i.e., rows (362$a$) through (362$i$)) each corresponding to a historical flow having a feature vector of 4 features (i.e., feature A (361$a$) through feature D (361$d$)). Each entry in the dataset (360) includes 4 feature values and a ground truth class label (361$e$). For example, the entry (362$a$) includes feature values (represented as $x_i$ in TABLE 2) showing that the corresponding historical flow has protocol type TCP, byte counts 1000, duration 20, and packet count 10. In addition, the entry (362$a$) includes the ground truth class label Y (represented as $y_i$ in TABLE 2) indicating that the corresponding historical flow is classified as a match by the classifier. Further as shown in FIG. 3D, the ground truth class label (361$e$) for each of the 9 entries collectively forms a ground truth class label vector y (361$f$) (represented as $y=[y_i]_n$ in TABLE 2). Said in other words, y is a vector of n (i.e., 9) ground truth class labels each from one of n (i.e., 9) entries in the training dataset (360).

Initially in Step 231 of FIG. 2B, a ground truth kernel $G=[G_{ij}]$ is constructed in an n×n matrix format by self multiplication of the ground truth class label vector y (361$f$). An example ground truth kernel G is shown as the ground truth kernel (375) in FIG. 3E.

In Step 232, n initial boosting weights (i.e., $W_0(i)$, i=1 ... n) are generated, where the i-th initial boosting weight represents initially estimated importance of the i-th entry in D. For example, each initial boosting weight may be assigned equal value as 1/n. In addition, consistent with the assigned n initial boosting weights, each matrix element $G_{ij}$ of the ground truth kernel G is assigned an initial weight $P_{ij}$ to initialize a weight matrix P as the initial weight matrix. For example, each initial weight $P_{ij}$ may be assigned equal value as $1/n^2$. An example initial weight matrix is shown in FIG. 3F as the initial weight matrix (371) where n=9. In one or more embodiments, the initial boosting weights relates to the initial weight $P_{ij}$ based on the formula $W_0(i)=\Sigma_j P_{ij}$.

Steps 233-237 correspond to the iteration loop of the algorithm listed in TABLE 2. In Step 233 for the t-th iteration, a decision tree is generated from the training dataset D based on a decision tree learning algorithm using n boosting weights $W_{t+1}(i)$. For the first iteration t=1, the n initial boosting weights $W_0(i)$ are used. An example of such decision tree is shown as the decision tree 1 (372) in FIG. 3E that is generated using $W_0(i)$ computed from the initial weight matrix (371). In particular, FIG. 3E shows a flow diagram of the first iteration of the algorithm listed in TABLE 2. The example decision tree 1 (372), generated from the example dataset (360) based on the decision tree learning algorithm using $W_0(i)$, is a single level binary classifying tree that maps each entry of the example dataset (360) to a predicted class label (i.e., +1 or −1) based on the feature value of the feature A (361$a$) in the each entry. In addition, a predicted class label vector 1 (373) (represented as h in FIG. 3E or $h_t$ where t=1 in TABLE 2) is generated to include 9 such predicted class labels mapped by the decision tree 1 (373) to the 9 entries in the example dataset (360). For example, for those entries having feature value TCP for the protocol type (i.e., feature A (361$a$)), the mapped class label is +1 in the predicted class label vector 1 (373). For all other entries, the mapped class label is −1.

In Step 234, the n boosting weights $W_{t+1}(i)$ are adjusted to generate n adjusted boosting weights $W_t(i)$ by comparing corresponding matrix elements $G_{ij}$ and $K_{ij}$ between the ground truth kernel (375) and a predicted kernel (or simply referred to as a kernel) $K_t=[K_{ij}]_t$ (for the t-th iteration) constructed by self multiplication of the predicted class label vector $h_t$ (i.e., $K_t=h_t*h_t^T$). Specifically, a matrix element mismatch in the comparison increases the estimated importance of the corresponding one of the n entries where the matrix element mismatch occurs. An example predicted kernel $K_t$ is shown as the predicted kernel 1 (374) in FIG. 3E for the first iteration. In one or more embodiments, the adjusted boosting weights $W_t(i)$ are generated as follows:

(i) Compute weights $P_{ij}$ for each kernel matrix element $K_{ij}$ to adjust the weight matrix P:

$P \leftarrow P \cdot \exp(-G \cdot K_t)$ with normalization (ii) Compute adjusted boosting weights for each flow (i.e., each entry in D) after adjusting the weight matrix P:

$W_t(i)=\Sigma_j P_{ij}$

The direct element by element multiplication $G \cdot K_t$ effectively performs the comparison of corresponding matrix elements $G_{ij}$ and $K_{ij}$. An example adjusted weight matrix P for the t-th iteration is shown as weight matrix t (381) in FIG. 3F. Note that the individual weights $P_{ij}$ shown in FIG. 3F are for example only.

In Step 235, a boosting weight for the t-th iteration is generated based on a measure of mismatch between the ground truth kernel G and the kernel $K_t$, where the boosting weight (denoted as $\alpha_t$) represents estimated importance of the kernel $K_t$. In one or more embodiments, the boosting weight $\alpha_t$ is computed as follows:

$$\epsilon_t = Pr(I(K_t \neq G))$$
$$\alpha_t = 0.5 \log((1-\epsilon_t)/\epsilon_t).$$

In the context of FIG. 3E where t=1, $\epsilon_t$ (i.e., $\epsilon_1$) represents probability of wrong prediction when comparing the ground truth kernel (375) and the predicted kernel 1 (374). Accordingly, $1-\epsilon_t$ (i.e., $1-\epsilon_1$) represents probability of correct prediction when comparing the ground truth kernel (375) and the predicted kernel 1 (374).

In Step 236, a cumulative kernel K is updated by summing the kernel from a previous iteration and the kernel of the current iteration based on the corresponding boosting weights. For example, the cumulative kernels at the end of first, second, and third iterations are given by $K=\alpha_1 K_1$, $K=\alpha_1 K_1+\alpha_2 K_2$, and $K=\alpha_1 K_1+\alpha_2 K_2+\alpha_3 K_3$, respectively.

In Step 237, a decision is made as to whether the iteration reaches a maximum number of iterations T. If the answer is no, the iteration count t is incremented to t+1 and the method returns to Step 233 to generate another decision tree from the training dataset based on the decision tree learning algorithm using the n adjusted boosting weights $W_t(i)$. In one or more embodiments, the maximum number of iterations T is predetermined. In one or more embodiments, the maximum number of iterations T is dynamically determined as the number of iterations when the computed items in successive iterations converge. For example, the iteration is considered reaching the maximum number of iterations T when the difference between the weight matrix t and weight matrix t+1 becomes less than a pre-determined threshold. When the maximum number of iterations T is reached, a final kernel is computed. For example if T=5, the cumulative kernel at the end of the fifth iteration is given by $K=\alpha_1 K_1+\alpha_2 K_2+\alpha_3 K_3+\alpha_4 K_4+\alpha_5 K_5$, where K is referred to as the final kernel.

Figure 3B:
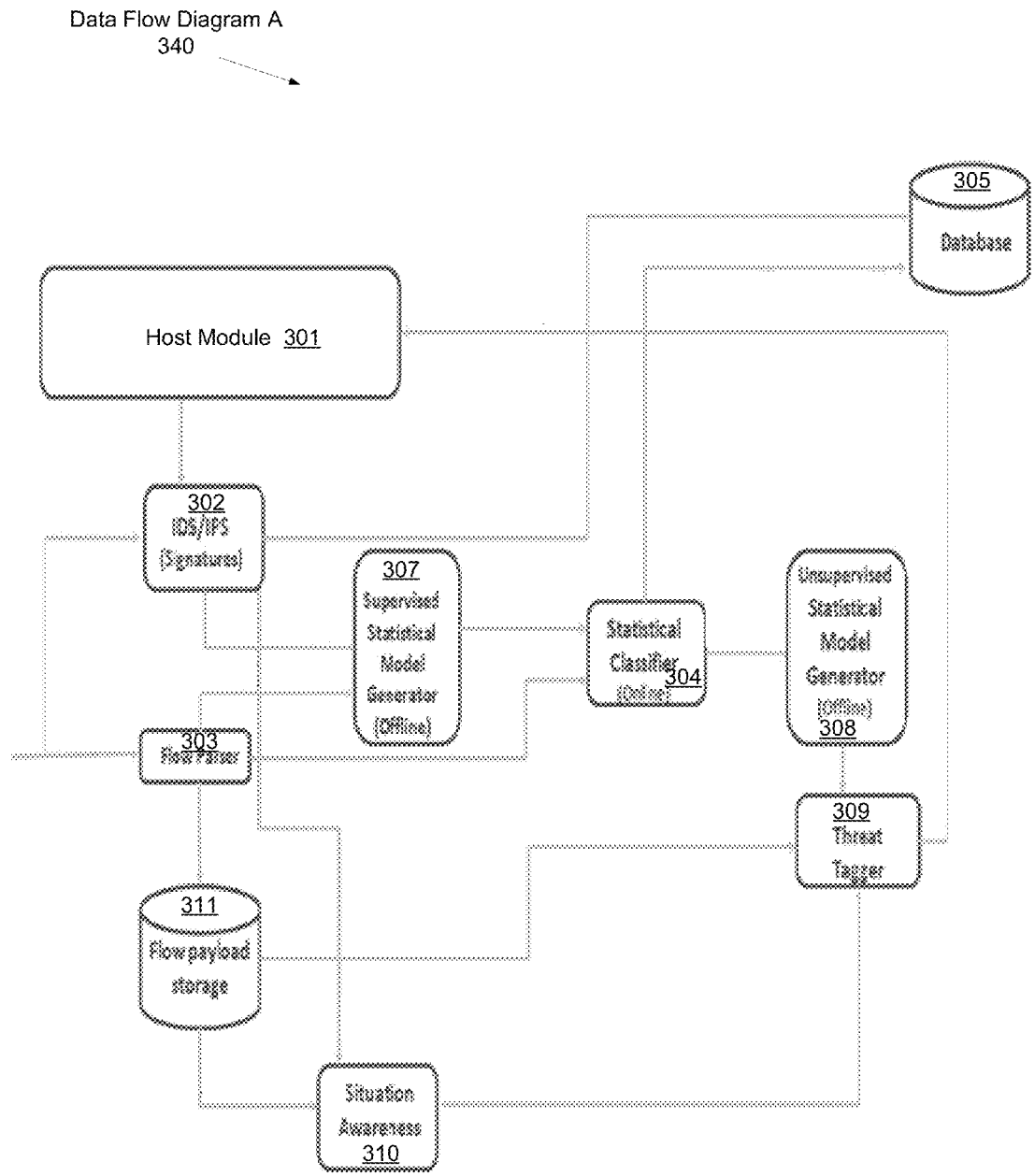
Figure 3C:
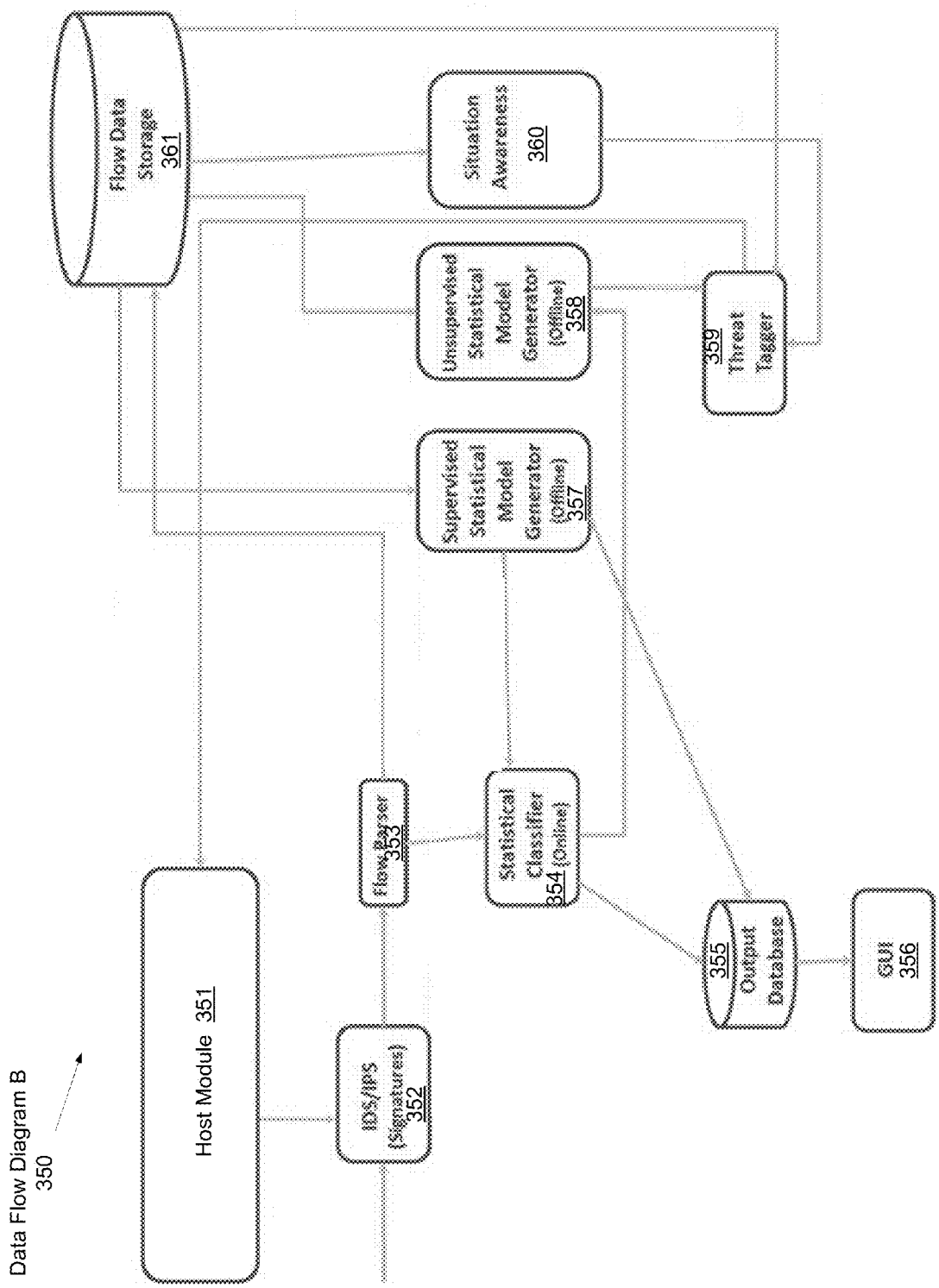
Figure 3E:
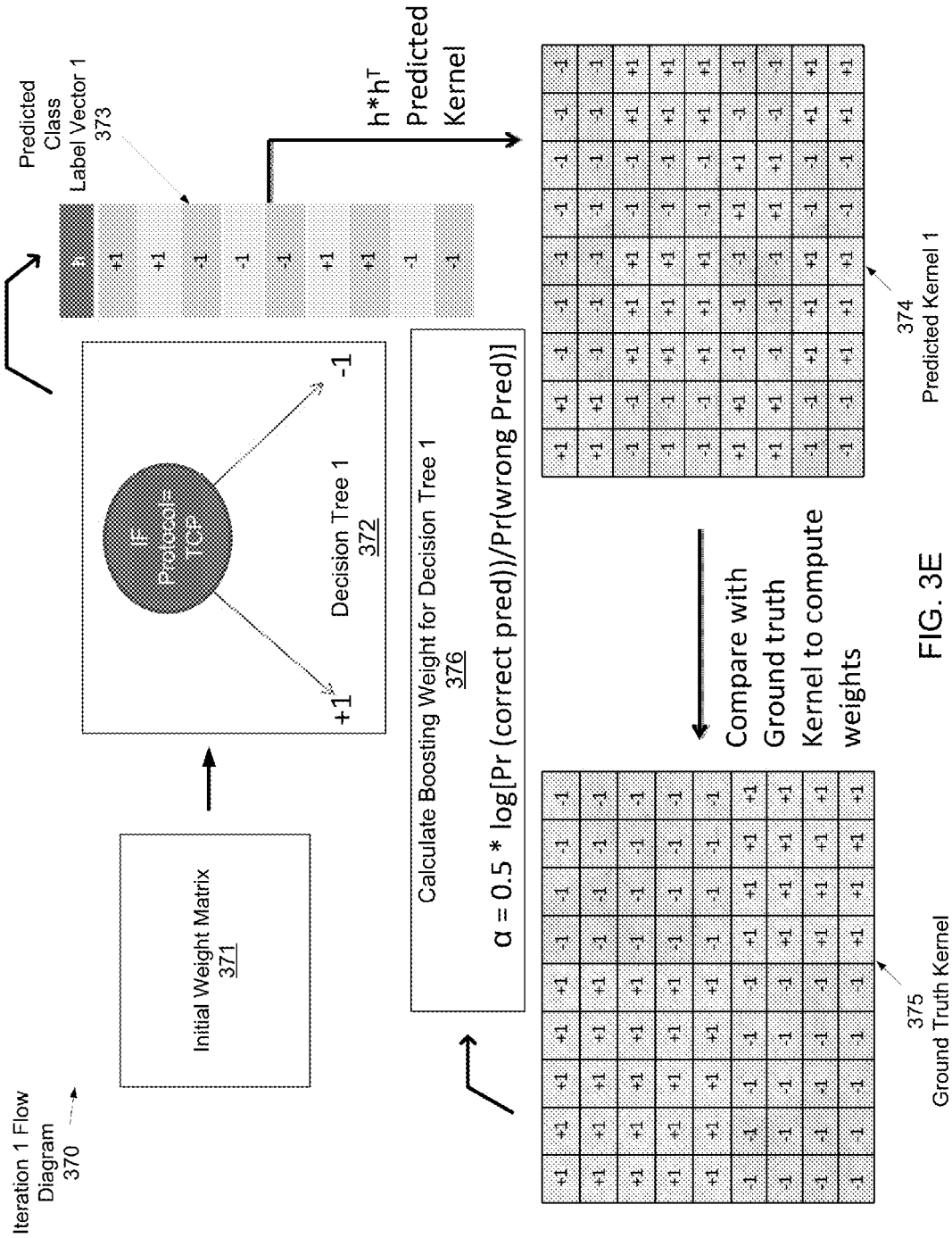
Figure 3G:
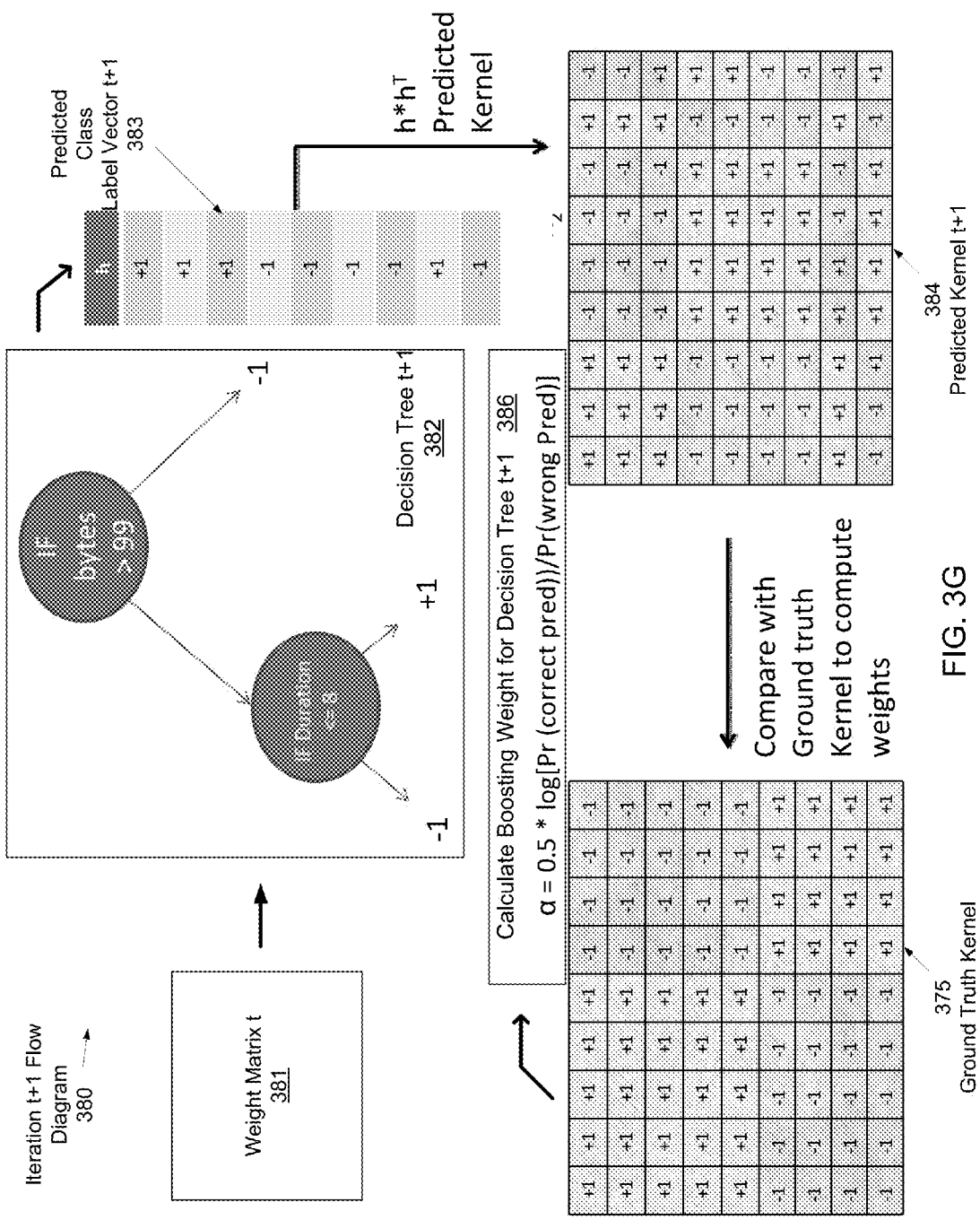

FIG. 3G shows an example flow diagram for the iteration t+1. As shown in FIG. 3G, the decision tree t+1 (382) is generated from the n adjusted boosting weights $W_t(i)$ derived from the weight matrix t (381) and is shown as a two level binary classifying tree that maps each entry of the example dataset (360) to a predicted class label (i.e., +1 or −1) based on the feature values of the feature B (361b) and the feature C (361c) in the each entry. In addition, a predicted class label vector t+1 (383) is generated to include 9 such predicted class labels mapped by the decision tree 1+1 (383) to the 9 entries in the example dataset (360). For example, for those entries having feature value >99 for the byte count (i.e., feature B (361b)) and duration <=8 for the feature duration (i.e., feature C (361c)), the mapped class label is +1 in the predicted class label vector t+1 (383). For all other entries, the mapped class label is −1.

Similar to the description in Step 234, the n previous adjusted boosting weights $W_t(i)$ are further adjusted to generate n adjusted boosting weights $W_{t+1}(i)$ by comparing corresponding matrix elements $G_{ij}$ and $K_{ij}$ between the ground truth kernel (375) and a predicted kernel $K_{t+1}=[K_{ij}]_{t+1}$ (for the (t+1)-th iteration) constructed by self multiplication of the predicted class label vector $h_{t+1}$ (i.e., $K_{t+1}=h_{t+1}*h_{t+1}^T$). An example predicted kernel $K_{t+1}$ is shown as the predicted kernel t+1 (384) in FIG. 3G for the (t+1)-th iteration.

Returning to the discussion of Step 237, if the answer is yes that t has reached the maximum number of iteration T, then the method proceeds to Step 238 where a behavioral model is generated based on the cumulative predicted kernel, referred to as a final kernel K. In one or more embodiments, the behavioral model is a SVM generated from the final kernel K. For example, the SVM may be generated from the final Kernel K using techniques known to those skilled in the art.

Once the behavioral model for the classifier of the ground truth dataset is generated, the behavioral model is used by the classifier to classify flows in the network traffic. Specifically, a class label for a new flow in the network traffic is determined based on whether the new flow matches the behavioral model. In one or more embodiments, any of the micro-level classifiers (218) may use such a behavioral model generated using the method of FIG. 2B. In one or more embodiments, the macro-level classifier (216) may also use such a behavioral model generated using the method of FIG. 2B.

The behavioral model generated using the method of FIG. 2B may be used in conjunction with the method of FIG. 2A to advantageously detect malware to address the following challenges:

(i) Large number of classes: A unique aspect of this problem is that the number of classes to be detected is very large (potentially up to millions of malware classes). As many of the sophisticated classifiers proposed in the literature were designed to handle a small number of classes, they are not scalable to the enormous number of classes encountered in this domain. For example, assuming there are 500k varieties of malware, a 1-versus-all multi-class approach requires applying half a million classifiers (each uniquely tuned to detect a specific malware class), whereas a 1-versus-1 approach would require invocation of more than 100 billion classifiers, which is clearly impractical.

(ii) Need for new class detection: Even though the number of possible classes is extremely large, not all classes are present at the time the classifier is initially trained. Since conventional classifiers assume the availability of training examples for each class during classifier construction, they are not designed for new class discovery. The problem is further compounded by the fact that the classifiers have to be deployed in an adversarial learning environment, where the hackers and virus developers continuously strive to design new malicious exploits that will out-maneuver and degrade the performance of existing classifiers.

(iii) Missing values: The features used to characterize the network flows may contain missing values. Missing values may arise due to the absence of information about a particular feature value or inapplicability of the feature to a given network flow. Failure to effectively handle the missing value problem often yields suboptimal classifiers. Though numerous strategies for handling missing values are available, results suggest that most of the conventional approaches are ineffective when applied to the malware detection problem.

(iv) Imbalanced class representation: In addition to the large number of classes, the class distribution is also highly skewed, with most of the flows belonging to a few of the most dominant classes. The imbalanced distribution makes a classifier more biased towards detecting the prevalent classes while completely misses the large number of rare classes. Though there are general approaches developed to address this problem (e.g., sampling and cost-sensitive learning), they have severe limitations when applied to datasets that contain a large number of classes and some hidden classes that are previously unknown.

(v) Noise in the training data: Building a supervised classifier for malware detection requires the availability of labeled training data. Currently, the data is labeled using signature-based IDS using rules provided by a third party. Since the rules do not provide a complete coverage of all types of malware, training instances labeled as good are unreliable and may include some previously unknown malware types. Furthermore, some activities that are considered malicious by one third party organization may be regarded as non-malicious by others. The presence of noisy class labels may lead to model overfitting, which will have an adverse impact on the overall performance of a classifier.

FIGS. 3B and 3C show a data flow diagram A (340) and data flow diagram B (350), respectively, in accordance with one or more embodiments of the invention. Those skilled in the art, having the benefit of this detailed description, will appreciate the components shown in FIGS. 3B and 3C may differ among embodiments of the invention, and that one or more of the components may be optional. Although specific numbers of components are shown in FIGS. 3B and 3C, different number of each component may be included. In one or more embodiments of the invention, one or more of the components shown in FIGS. 3B and 3C may be omitted, repeated, supplemented, and/or otherwise modified from that shown in FIGS. 3B and 3C. Accordingly, the specific arrangement of components shown in FIGS. 3B and 3C should not be construed as limiting the scope of the invention. In one or more embodiments of the invention, the data flows depicted in FIGS. 3A and 3B may be practiced using system (200) of FIG. 1B and the corresponding method described with respect to FIG. 2A.

As shown in FIG. 3B, the data flow diagram A (340) includes host module (301) that corresponds to the host module (101) of FIG. 1A and is configured to generate payload based signatures for different malicious activities for providing to IDS/IPS (302) to detect malicious flows. The IDS/IPS (302) corresponds to IDS/IPS (106) of FIG. 1A or the pattern matching engine (202) of FIG. 1B. This is essentially an offline process and whenever a new threat signature is generated by the host module (301), IDS/IPS (302) is provided with the new additional signatures.

The input to the data flow diagram A (340) is the sequence of IP packets as being captured by the IDS/IPS (302) and the flow parser (303). These packets are then processed by the flow parser (303), which aggregates packets into flows. It computes a set of N different statistical layer 3/layer 4 information for each flow (i.e., $F_k^{FEATURES}=\{f_1, \ldots, f_n\}^N$), as well as extracts layer 7 payload associated with each of these flows ($F_k^{PAYLOAD}$). The flow payloads are then passed through the IDS/IPS (302) that has already loaded all the layer 7 payload based signatures for different threats generated by the host module (301). Notice that the set of signatures will be updated regularly by the host module (301) whenever any newly discovered signature becomes available. When a flow matches any of the signatures (referred to as a positive match), the IDS/IPS (302) tags the flow as known/bad; in case the flow does not match any of the signatures (referred to as a negative match), then the flow is tagged unknown. This type of tagging is referred to as macro-level tagging using only two types of tags, the known/bad tag and the unknown tag. Furthermore, in case of a positive match, the IDS/IPS (302) will append to the macro-level tag an extra inner tag that reflects the specific type of threat the flow has matched. This type of tagging is referred to as micro-level tagging, denoted as $F_k^{HOST}=\{L_k\}$ in FIG. 3B. For example, a flow matching the Conficker-Worm-version-A signature will be tagged by the IDS/IPS (302) with macro-level tag <known/bad> and micro-level tag <cw-v.a>, i.e., $F_k^{HOST}=\{known,bad,cw-v.a\}$. For each processed flow, the vector of layer 3/layer 4 statistical features $F_k^{FEATURES}=\{f_1, \ldots, f_n\}^N$ is also extracted. The flow is then stored in the flow payload storage (311). For each flow, the flow payload storage (311) stores the payloads, layer 3/layer 4 feature information, and the corresponding label (i.e., macro-level tag, micro-level tag), which are used as a training example for the supervised statistical model generator (307). Specifically, supervised statistical model generator (307) operates in offline manner to extract statistical models based on the layer 3/layer 4 features to capture both the coarse behavior separating known/bad flows from unknown flows as well as the specific behavior of each type of threat within the known/bad flows. As discussed in reference to FIG. 1B above, the coarse behavior is captured in a group behavioral model for macro-level profiling while the specific behavior of each type of threat is captured in a threat specific behavioral model for micro-level profiling. In particular, these layer 3/layer 4 flow feature based models correspond to the statistical model (215) of FIG. 1B.

The online statistical classifier (304) uses all the flow-feature based models generated by the supervised statistical model generator (307) for identifying different threats in real time. Based on these models, the online statistical classifier (304) generates a macro-level label (known/bad or unknown) for each flow classified and a micro-level label for the flow with the bad label. In a training phase, the results of the online statistical classifier (304) are calibrated with the layer 7 signature matching by the IDS/IPS (302). In addition, the online statistical classifier (304) also generates a "suspicious" flag for any flow that is classified as bad but not classified with any of the micro-labels with some level of confidence. All the output of the online statistical classifier (304) is stored in the database (305) with flow ids.

Return to the discussion of the supervised statistical model generator (307) that works on flows stored in the flow payload storage (311). It uses all the flow-features (not payloads) with the corresponding threat labels and generates two types of statistical models reflecting two different levels of granularity in the grouping. When the supervised statistical model generator (307) generates the macro-level model, it generates a model to separate all the flows with known/bad label and the flows with unknown label. Such a model will label all the new flows with the macro-label known/bad (or unknown) which are similar to the previous known/bad (or unknown) flows. The second level of grouping is achieved by expanding the known/bad flows into J distinct malware classes, where each class j=1, . . . , J represents a specific type of threat that has produced at least a flow with a positive match. For both the macro-class and micro-class classification, the supervised statistical model generator (307) uses machine learning algorithms on the group of provided statistical features to create statistical models that retain the hidden properties of each of the constructed groups. For the macro-level grouping, this module produces one statistical model that separates the known/bad flows and the unknown flows. For the micro-level grouping, the supervised statistical model generator (307) produces J statistical models for identifying each of the j=1, . . . , J threats.

At each regular time [t], the statistical models and the associated malware tags (i.e., $M_{[t]}=\{<M_j,L_j>\}_{j=1}^J$) are provided to an online statistical classifier (304) that uses the newly generated models to discover threat patterns in incoming flows. For example, when threats hide themselves in encrypted flows, payload-based signatures are known to be inadequate. If these threats or similar threats have been analyzed in the past in non-encrypted flows, a correct statistical model representative of their behavior exists and can be used to detect such threats hiding behind encrypted flows. Furthermore, in the case of zero-day threats (i.e., threats never seen before and thus no signature or statistical model was available at the time of the training), they can still be detected if their behavior still falls in the statistical model of known/bad traffic. In the latter case, the online statistical classifier (304) will use the label "suspicious" to tag these flows (L=<"s">) and store the associated flow identifiers for further analysis. When enough suspicious flows have been observed, then an off-line process is initiated to resolve the number of distinct threat classes these flows may belong to. This off-line process is performed by the unsupervised statistical model generator (308) that uses unsupervised machine learning techniques to identify the number of hidden threat clusters present in the set of suspicious flows (i.e., suspicious clusters of cardinality I). For each cluster, the suspicious flows that behave similarly in terms of communication pattern are identified and stored in one of the flow-buckets $B_{i=1}^I$ i=1, . . . , I. Each flow-bucket is then forwarded to the threat tagger (309) that extracts the flow identifiers, retrieves the correspondent flow payloads from the flow payload storage (311), and analyzes the flow payloads to automatically extract the threat payload signature. The threat tagger (309) corresponds to the signature generator (214) depicted in FIG. 1B above. Signatures for each newly discovered flow-bucket is then forwarded, e.g., via the module (301), to the IDS/IPS (302) that will start using them for tagging/labeling incoming flows.

Although successful in extracting the payload signature of the newly discovered malware, the threat tagger (309) will not be able to retrieve the associated label (marked <L=?>). In order to overcome this limitation, the threat tagger (309) shares specific information with the host module (301). More specifically, any executable found by the threat tagger (309) in any of the flow in a flow-bucket is forwarded to the host module (301) for retrieving the unknown threat label. In case no executable can be found, the threat tagger (309) provides the host module (301) with labels of the set of known/bad threats with which the new threat shares the highest level of behavioral structure. The host module (301) then compares whether such behavioral similarity is shared at the state machine level as well. If so, the host module (301) generates an internal label to track the new threat until a formal label available, e.g., formally recognized by the malware research community.

As shown in FIG. 3C, the data flow diagram B (350) includes essentially the same components as the data flow diagram A (340) depicted in FIG. 3B with the exception that the data flow arrows are arranged to emphasize a serial configuration for ease of physical implementation. For example, an arrow between modules of the data flow diagram B (350) represent output data generated by a source module that may or may not be appended to at least a portion of input data passed through the source module. As shown, the host module (351), IDS/IPS (352), flow parser (353), statistical classifier (354), output database (355), flow data storage (361), supervised statistical model generator (357), unsupervised statistical model generator (358), threat tagger (359), and situation awareness module (360) correspond to the host module (301), IDS/IPS (302), flow parser (303), statistical classifier (304), database (305), flow payload storage (311), supervised statistical model generator (307), unsupervised statistical model generator (308), threat tagger (309), and situation awareness module (310) depicted in FIG. 3B above. Accordingly, the data flow operations depicted in FIG. 3A are essentially the same as those depicted in FIG. 3B above. Further, the GUI (356) corresponds to the GUI (212) depicted in FIG. 1B above.

Figure 4:
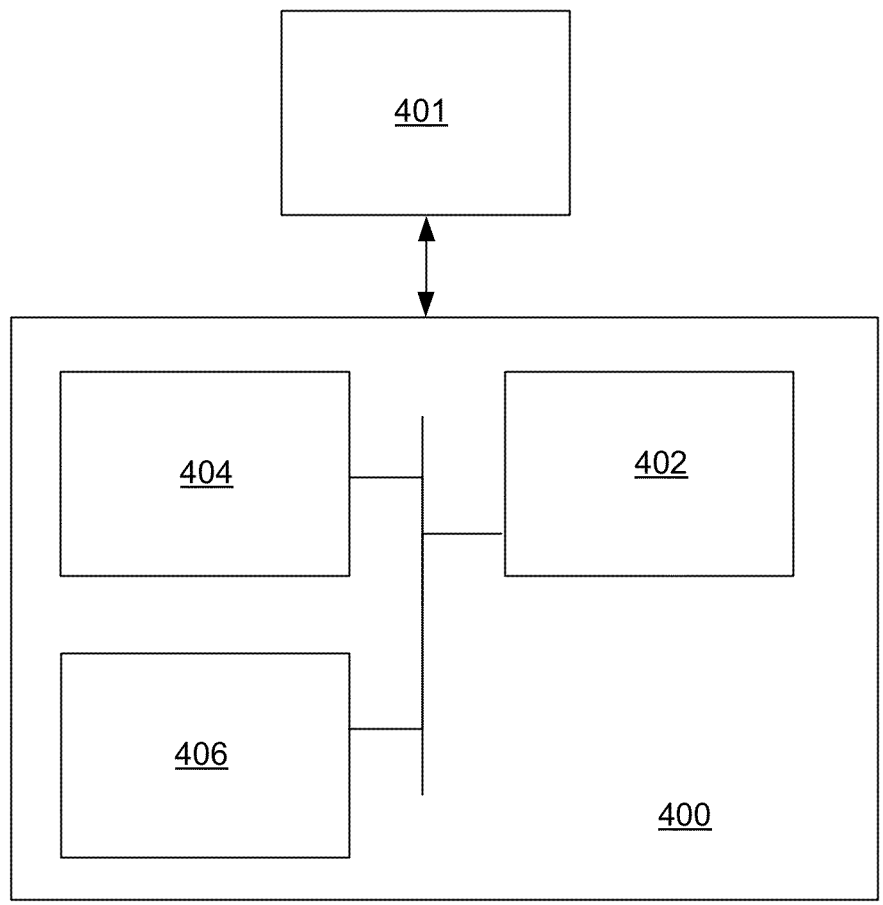
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources.

Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for profiling network traffic of a network, comprising:
    obtaining a training dataset having n entries each comprising a plurality of feature values and a ground truth class label, wherein the plurality of feature values correspond to a plurality of features of a historical flow in the network traffic, wherein the historical flow is tagged with the ground truth class label based on data characteristics associated with a corresponding application executing in the network;
    constructing a ground truth kernel in a n×n matrix format by self multiplication of a ground truth class label vector, wherein the ground truth class label vector comprises n ground truth class labels each from one of the n entries in the training dataset;
    generating n initial boosting weights each corresponding to one of the n entries in the training dataset, wherein each of the n initial boosting weights represents estimated importance of a corresponding one of the n entries;
    generating, by a processor of a computer system, a first decision tree from the training dataset based on a decision tree learning algorithm using the n initial boosting weights, wherein the first decision tree maps each entry of the training dataset to a corresponding one in n first predicted class labels based on the plurality of feature values in the each entry, wherein a first predicted class label vector comprises the n first predicted class labels mapped by the first decision tree to the n entries in the training dataset;
    adjusting the n initial boosting weights to generate n adjusted boosting weights by comparing corresponding matrix elements between the ground truth kernel and a first kernel constructed by self multiplication of the first predicted class label vector, wherein a first matrix element mismatch increases the importance of the corresponding one of the n entries where the first matrix element mismatch occurs;
    generating, by the processor, a second decision tree from the training dataset based on the decision tree learning algorithm using the n adjusted boosting weights, wherein the second decision tree maps the each entry of the training dataset to a second predicted class label based on the plurality of feature values in the each entry, wherein a second predicted class label vector comprises n second predicted class labels mapped by the second decision tree to the n entries in the training dataset;
    generating, by the processor, a behavioral model based at least on the first predicted class label vector and the second predicted class label vector; and
    determining a class label for a new flow in the network traffic based on whether the new flow matches the behavioral model.

2. The method of claim 1, further comprising:
    generating, based on a first measure of mismatch between the ground truth kernel and the first kernel, a first boosting weight representing estimated importance of the first predicted class label vector;

generating, based on a second measure of mismatch between the first kernel and a second kernel constructed by self multiplication of the second predicted class label vector, a second boosting weight representing estimated importance of the second predicted class label vector; and generating a cumulative kernel by summing the first kernel and the second kernel based on the first boosting weight and the second boosting weight;

wherein the behavioral model is generated from the cumulative kernel.

3. The method of claim 1, further comprising:

adjusting the n adjusted boosting weights to generate n further adjusted boosting weights by comparing corresponding matrix elements between the first kernel and a second kernel constructed by self multiplication of the second predicted class label vector, wherein a second matrix element mismatch increases the importance of the corresponding one of the n entries where the second matrix element mismatch occurs; and generating, by the processor, a third decision tree from the training dataset based on the decision tree learning algorithm using the n further adjusted boosting weights, wherein the third decision tree maps the each entry of the training dataset to a third predicted class label based on the plurality of feature values in the each entry, wherein a third predicted class label vector comprises n third predicted class labels mapped by the third decision tree to the n entries in the training dataset, wherein generating the behavioral model is further based at least on the third predicted class label vector.

4. The method of claim 1, wherein the behavioral model comprises a support vector machine (SVM).

5. The method of claim 1, further comprising:

obtaining a signature library comprising a plurality of signatures corresponding to a plurality of behavioral models comprising the behavioral model;

generating, based on a pre-determined criterion, a group behavioral model associated with the signature library, wherein the group behavioral model represents a common behavior of a plurality of historical flows identified from the network traffic, wherein each of the plurality of signatures correlates to a subset of the plurality of historical flows;

selecting a flow in the network traffic for including in a target flow set, wherein the flow matches the group behavioral model without matching any of the plurality of behavioral models;

analyzing the target flow set to generate a new signature; and adding the new signature to the signature library.

6. The method of claim 5, further comprising:

updating the group behavioral model and the target flow set in response to adding the new signature to the signature library.

7. The method of claim 5, wherein each of the plurality of signatures, and a corresponding behavioral model thereof, are associated with a malicious activity, and wherein the group behavioral model comprises a threat model.

8. A system for profiling network traffic of a network, comprising:

a processor;

memory storing instructions, when executed by the processor comprising functionality for:

obtaining a training dataset having n entries each comprising a plurality of feature values and a ground truth class label, wherein the plurality of feature values correspond to a plurality of features of a historical flow in the network traffic, wherein the historical flow is tagged with the ground truth class label based on data characteristics associated with a corresponding application executing in the network;

constructing a ground truth kernel in a n×n matrix format by self multiplication of a ground truth class label vector, wherein the ground truth class label vector comprises n ground truth class labels each from one of the n entries in the training dataset;

generating n initial boosting weights each corresponding to one of the n entries in the training dataset, wherein each of the n initial boosting weights represents estimated importance of a corresponding one of the n entries;

generating a first decision tree from the training dataset based on a decision tree learning algorithm using the n initial boosting weights, wherein the first decision tree maps each entry of the training dataset to a corresponding one in n first predicted class labels based on the plurality of feature values in the each entry, wherein a first predicted class label vector comprises the n first predicted class labels mapped by the first decision tree to the n entries in the training dataset;

adjusting the n initial boosting weights to generate n adjusted boosting weights by comparing corresponding matrix elements between the ground truth kernel and a first kernel constructed by self multiplication of the first predicted class label vector, wherein a first matrix element mismatch increases the importance of the corresponding one of the n entries where the first matrix element mismatch occurs;

generating a second decision tree from the training dataset based on the decision tree learning algorithm using the n adjusted boosting weights, wherein the second decision tree maps the each entry of the training dataset to a second predicted class label based on the plurality of feature values in the each entry, wherein a second predicted class label vector comprises n second predicted class labels mapped by the second decision tree to the n entries in the training dataset;

generating a behavioral model based at least on the first predicted class label vector and the second predicted class label vector; and determining a class label for a new flow in the network traffic based on whether the new flow matches the behavioral model.

9. The system of claim 8, the instruction when executed by the processor further comprising functionality for:

generating, based on a first measure of mismatch between the ground truth kernel and the first kernel, a first boosting weight representing estimated importance of the first predicted class label vector;

generating, based on a second measure of mismatch between the first kernel and a second kernel constructed by self multiplication of the second predicted class label vector, a second boosting weight representing estimated importance of the second predicted class label vector; and generating a cumulative kernel by summing the first kernel and the second kernel based on the first boosting weight and the second boosting weight;

wherein the behavioral model is generated from the cumulative kernel.

10. The system of claim 8, the instruction when executed by the processor further comprising functionality for:
adjusting the n adjusted boosting weights to generate n further adjusted boosting weights by comparing corresponding matrix elements between the first kernel and a second kernel constructed by self multiplication of the second predicted class label vector, wherein a second matrix element mismatch increases the importance of the corresponding one of the n entries where the second matrix element mismatch occurs; and
generating, by the processor, a third decision tree from the training dataset based on the decision tree learning algorithm using the n further adjusted boosting weights, wherein the third decision tree maps the each entry of the training dataset to a third predicted class label based on the plurality of feature values in the each entry, wherein a third predicted class label vector comprises n third predicted class labels mapped by the third decision tree to the n entries in the training dataset,
wherein generating the behavioral model is further based at least on the third predicted class label vector.

11. The system of claim 8, wherein the behavioral model comprises a support vector machine (SVM).

12. The system of claim 8,
a signature library comprising a plurality of signatures corresponding to a plurality of behavioral models comprising the behavioral model;
a statistical model generator executing on the processor and configured to generate, based on a pre-determined criterion, a group behavioral model associated with the signature library, wherein the group behavioral model represents a common behavior of a plurality of historical flows identified from the network traffic, wherein each of the plurality of signatures correlates to a subset of the plurality of historical flows;
a statistical classifier executing on the processor and configured to select a flow in the network traffic for including in a target flow set, wherein the flow matches the group behavioral model without matching any of the plurality of behavioral models; and
a signature generator executing on the processor and configured to:
analyze the target flow set to generate a new signature; and
add the new signature to the signature library.

13. The system of claim 12,
wherein the statistical model generator is further configured to update the group behavioral model in response to adding the new signature to the signature library, and
wherein the statistical classifier is further configured to update the target flow set in response to adding the new signature to the signature library.

14. The system of claim 12,
wherein each first data characteristics of the plurality of signatures is associated with a malicious activity generated by the corresponding application, and
wherein the group behavioral model comprises a threat model.

15. A non-transitory computer readable medium, embodying instructions to profile network traffic of a network, the instructions when executed by the computer comprising functionality for:
obtaining a training dataset having n entries each comprising a plurality of feature values and a ground truth class label, wherein the plurality of feature values correspond to a plurality of features of a historical flow in the network traffic, wherein the historical flow is tagged with the ground truth class label based on data characteristics associated with a corresponding application executing in the network;
constructing a ground truth kernel in a n×n matrix format by self multiplication of a ground truth class label vector, wherein the ground truth class label vector comprises n ground truth class labels each from one of the n entries in the training dataset;
generating n initial boosting weights each corresponding to one of the n entries in the training dataset, wherein each of the n initial boosting weights represents estimated importance of a corresponding one of the n entries;
generating a first decision tree from the training dataset based on a decision tree learning algorithm using the n initial boosting weights, wherein the first decision tree maps each entry of the training dataset to a corresponding one in n first predicted class labels based on the plurality of feature values in the each entry, wherein a first predicted class label vector comprises the n first predicted class labels mapped by the first decision tree to the n entries in the training dataset;
adjusting the n initial boosting weights to generate n adjusted boosting weights by comparing corresponding matrix elements between the ground truth kernel and a first kernel constructed by self multiplication of the first predicted class label vector, wherein a first matrix element mismatch increases the importance of the corresponding one of the n entries where the first matrix element mismatch occurs;
generating a second decision tree from the training dataset based on the decision tree learning algorithm using the n adjusted boosting weights, wherein the second decision tree maps the each entry of the training dataset to a second predicted class label based on the plurality of feature values in the each entry, wherein a second predicted class label vector comprises n second predicted class labels mapped by the second decision tree to the n entries in the training dataset;
generating a behavioral model based at least on the first predicted class label vector and the second predicted class label vector; and
determining a class label for a new flow in the network traffic based on whether the new flow matches the behavioral model.

16. The non-transitory computer readable medium of claim 15, the instructions when executed by the computer further comprising functionality for:
generating, based on a first measure of mismatch between the ground truth kernel and the first kernel, a first boosting weight representing estimated importance of the first predicted class label vector;
generating, based on a second measure of mismatch between the first kernel and a second kernel constructed by self multiplication of the second predicted class label vector, a second boosting weight representing estimated importance of the second predicted class label vector; and
generating a cumulative kernel by summing the first kernel and the second kernel based on the first boosting weight and the second boosting weight;
wherein the behavioral model is generated from the cumulative kernel.

17. The non-transitory computer readable medium of claim 15, the instructions when executed by the computer further comprising functionality for:

adjusting the n adjusted boosting weights to generate n further adjusted boosting weights by comparing corresponding matrix elements between the first kernel and a second kernel constructed by self multiplication of the second predicted class label vector, wherein a second matrix element mismatch increases the importance of the corresponding one of the n entries where the second matrix element mismatch occurs; and generating a third decision tree from the training dataset based on the decision tree learning algorithm using the n further adjusted boosting weights, wherein the third decision tree maps the each entry of the training dataset to a third predicted class label based on the plurality of feature values in the each entry, wherein a third predicted class label vector comprises n third predicted class labels mapped by the third decision tree to the n entries in the training dataset, wherein generating the behavioral model is further based at least on the third predicted class label vector.

18. The non-transitory computer readable medium of claim 15, wherein the behavioral model comprises a support vector machine (SVM).

19. The non-transitory computer readable medium of claim 15, the instructions when executed by the computer further comprising functionality for:

obtaining a signature library comprising a plurality of signatures corresponding to a plurality of behavioral models comprising the behavioral model;

generating, based on a pre-determined criterion, a group behavioral model associated with the signature library, wherein the group behavioral model represents a common behavior of a plurality of historical flows identified from the network traffic, wherein each of the plurality of signatures correlates to a subset of the plurality of historical flows;

selecting a flow in the network traffic for including in a target flow set, wherein the flow matches the group behavioral model without matching any of the plurality of behavioral models;

analyzing the target flow set to generate a new signature;

adding the new signature to the signature library; and updating the group behavioral model and the target flow set in response to adding the new signature to the signature library.

20. The non-transitory computer readable medium of claim 19, the instructions when executed by the computer further comprising functionality for:

wherein each of the plurality of signatures, and a corresponding behavioral model thereof, are associated with a malicious activity, and wherein the group behavioral model comprises a threat model.

* * * * *